United States Patent
Yang et al.

(10) Patent No.: US 11,792,802 B2
(45) Date of Patent: *Oct. 17, 2023

(54) UPLINK SHARED CHANNEL FEEDBACK PIGGYBACKING

(71) Applicant: QUALCOMM Incorporated, San Diego, CA (US)

(72) Inventors: Wei Yang, San Diego, CA (US); Yi Huang, San Diego, CA (US); Seyedkianoush Hosseini, San Diego, CA (US); Wanshi Chen, San Diego, CA (US); Peter Gaal, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 17/144,034

(22) Filed: Jan. 7, 2021

(65) Prior Publication Data

US 2021/0219321 A1 Jul. 15, 2021

Related U.S. Application Data

(60) Provisional application No. 62/959,821, filed on Jan. 10, 2020.

(51) Int. Cl.
*H04W 72/21* (2023.01)
*H04W 72/23* (2023.01)
*H04W 72/566* (2023.01)

(52) U.S. Cl.
CPC .......... *H04W 72/21* (2023.01); *H04W 72/23* (2023.01); *H04W 72/569* (2023.01)

(58) Field of Classification Search
CPC ... H04L 1/1664; H04L 1/1854; H04L 1/1864; H04W 72/042; H04W 72/1242; H04W 72/1284; H04W 72/1289; H04W 72/14
See application file for complete search history.

(56) References Cited

U.S. PATENT DOCUMENTS 9,295,056 B2 * 3/2016 Chen ..................... H04L 1/1893
9,635,654 B2 * 4/2017 Hwang ................. H04L 1/1861
(Continued)

FOREIGN PATENT DOCUMENTS

EP          3681072 A1 *  7/2020  .......... H04B 7/0478
EP          3869719 A1 *  8/2021  .......... H04L 1/1671
EP          3869719 A4 * 12/2021  .......... H04L 1/1671

*Primary Examiner* — Eric Nowlin
(74) *Attorney, Agent, or Firm* — Holland & Hart LLP/Qualcomm Incorporated

(57) ABSTRACT

Methods, systems, and devices for wireless communications are described. A user equipment (UE) may receive an uplink grant that indicates scheduling information for an uplink shared channel transmission by the UE. The UE may also receive a downlink grant scheduling feedback information to be piggybacked on the uplink shared channel transmission, and may determine whether the downlink grant has been received after the uplink grant. The UE may then select from a set of resources indicated in the uplink grant, or determine that a feedback piggybacking condition has been met based on the downlink grant. The UE may perform the uplink shared channel transmission to the base station, in some cases including the feedback information.

28 Claims, 17 Drawing Sheets

(56) References Cited

U.S. PATENT DOCUMENTS

| | | | | |
|---|---|---|---|---|
| 10,103,849 B2* | 10/2018 | Park | | H04L 1/1812 |
| 10,341,000 B2* | 7/2019 | Lee | | H04L 1/1812 |
| 10,375,681 B2* | 8/2019 | Papasakellariou | | H04L 1/1671 |
| 10,440,698 B2* | 10/2019 | Wang | | H04L 5/0053 |
| 10,492,184 B2* | 11/2019 | Papasakellariou | | H04L 5/0055 |
| 10,757,706 B2* | 8/2020 | Sun | | H04L 1/1861 |
| 10,763,991 B2* | 9/2020 | Baldemair | | H04W 72/14 |
| 10,812,225 B2* | 10/2020 | Papasakellariou | | H04L 5/0053 |
| 10,855,403 B2* | 12/2020 | Medles | | H04W 72/1268 |
| 10,880,167 B2* | 12/2020 | Chen | | H04W 24/02 |
| 10,880,915 B2* | 12/2020 | Lee | | H04L 5/0057 |
| 10,925,082 B2* | 2/2021 | Ye | | H04L 5/0042 |
| 11,019,607 B2* | 5/2021 | Papasakellariou | | H04L 1/1812 |
| 11,233,551 B2* | 1/2022 | Ye | | H04B 7/0478 |
| 11,234,223 B2* | 1/2022 | Wang | | H04W 72/042 |
| 11,234,224 B2* | 1/2022 | Takeda | | H04W 72/1268 |
| 2013/0058315 A1* | 3/2013 | Feuersanger | | H04W 74/0833 370/336 |
| 2013/0083766 A1* | 4/2013 | Chung | | H04L 5/0053 370/329 |
| 2013/0100917 A1* | 4/2013 | Seo | | H04W 72/1284 370/329 |
| 2013/0250924 A1* | 9/2013 | Chen | | H04W 72/0446 370/336 |
| 2015/0189574 A1* | 7/2015 | Ng | | H04W 24/08 370/254 |
| 2015/0208402 A1* | 7/2015 | Hwang | | H04W 72/0413 370/329 |
| 2016/0050667 A1* | 2/2016 | Papasakellariou | | H04L 5/0048 370/329 |
| 2016/0100422 A1* | 4/2016 | Papasakellariou | | H04W 72/1289 370/329 |
| 2016/0269104 A1* | 9/2016 | Lee | | H04H 20/38 |
| 2016/0353387 A1* | 12/2016 | Gao | | H04W 52/346 |
| 2018/0034526 A1* | 2/2018 | Lee | | H04B 7/0647 |
| 2018/0167931 A1* | 6/2018 | Papasakellariou | | H04L 1/00 |
| 2018/0167932 A1* | 6/2018 | Papasakellariou | | H04L 1/1671 |
| 2018/0227908 A1* | 8/2018 | Wang | | H04L 5/0091 |
| 2018/0262398 A1* | 9/2018 | Chen | | H04W 52/18 |
| 2018/0351704 A1* | 12/2018 | Papasakellariou | | H04W 52/0251 |
| 2019/0141696 A1* | 5/2019 | Kim | | H04W 72/0413 |
| 2019/0199468 A1* | 6/2019 | Zhao | | H04L 1/1854 |
| 2019/0199477 A1* | 6/2019 | Park | | H04L 5/0055 |
| 2019/0223201 A1* | 7/2019 | Lee | | H04W 72/0413 |
| 2019/0223207 A1* | 7/2019 | Huang | | H04W 72/1289 |
| 2019/0253196 A1* | 8/2019 | Medles | | H04L 1/1854 |
| 2020/0008191 A1* | 1/2020 | Wang | | H04L 5/0055 |
| 2020/0068608 A1* | 2/2020 | Ye | | H04W 72/048 |
| 2020/0077386 A1* | 3/2020 | Papasakellariou | | H04L 1/1854 |
| 2020/0136750 A1* | 4/2020 | Baldemair | | H04L 5/0053 |
| 2020/0228173 A1* | 7/2020 | Ye | | H04L 1/1819 |
| 2020/0236669 A1* | 7/2020 | Takeda | | H04W 28/06 |
| 2020/0296715 A1* | 9/2020 | Wang | | H04L 1/1819 |
| 2020/0351010 A1* | 11/2020 | Baldemair | | H04L 1/0073 |
| 2021/0105102 A1* | 4/2021 | Li | | H04L 1/1896 |
| 2021/0112578 A1* | 4/2021 | Yang | | H04W 24/10 |
| 2021/0168794 A1* | 6/2021 | Zhang | | H04L 5/0044 |
| 2021/0184801 A1* | 6/2021 | El Hamss | | H04L 1/1896 |
| 2021/0385809 A1* | 12/2021 | Kang | | H04W 72/0453 |
| 2022/0070855 A1* | 3/2022 | Zhang | | H04W 72/042 |
| 2022/0078768 A1* | 3/2022 | El Hamss | | H04L 1/1812 |
| 2022/0150918 A1* | 5/2022 | Xu | | H04W 72/14 |

\* cited by examiner

UPLINK SHARED CHANNEL FEEDBACK PIGGYBACKING

CROSS REFERENCE

The present application for patent claims the benefit of U.S. Provisional Patent Application No. 62/959,821 by Yang et al., entitled "UPLINK SHARED CHANNEL FEEDBACK PIGGYBACKING," filed Jan. 10, 2020, assigned to the assignee hereof, and expressly incorporated by reference in its entirety herein.

FIELD OF TECHNOLOGY

The following relates generally to wireless communications and more specifically to uplink shared channel feedback piggybacking.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support uplink shared channel feedback piggybacking. Generally, the described techniques provide for piggybacking feedback information on an uplink shared channel transmission in cases where the feedback information is based on a late downlink shared channel transmission, such that the feedback information may be piggybacked on the earlier uplink shared channel transmission.

In a first case, a user equipment (UE) may receive an uplink grant from a base station that indicates scheduling information for an uplink shared channel transmission by the UE, the scheduling information including a first set of uplink resources and a second set of uplink resources. The UE may determine whether a downlink grant scheduling feedback information to be piggybacked on the uplink shared channel transmission has been received after the uplink grant. The UE may select one of the first set of uplink resources of the second set of uplink resources based on the determining. The UE may perform the uplink shared channel transmission using the selected one of the first set of uplink resources of the second set of uplink resources.

In a second case, a UE may receive an uplink grant from a base station that indicates scheduling information for an uplink shared channel transmission for the UE. The UE may also receive from the base station, after receiving the uplink grant, a downlink grant scheduling feedback information to be piggybacked on the uplink shared channel transmission. The UE may determine, based on the downlink grant, that a feedback piggybacking condition is satisfied. The UE may perform the uplink shared channel transmission based on the determining, where the uplink shared channel transmission includes the feedback information.

A method of wireless communications at a UE is described. The method may include receiving an uplink grant that indicates scheduling information for an uplink shared channel transmission by the UE, the scheduling information including a first set of uplink resources and a second set of uplink resources, determining whether a downlink grant scheduling feedback information to be piggybacked on the uplink shared channel transmission has been received after the uplink grant, selecting one of the first set of uplink resources or the second set of uplink resources based on the determining, and performing the uplink shared channel transmission using the selected one of the first set of uplink resources or the second set of uplink resources.

An apparatus for wireless communications at a UE is described. The apparatus may include a processor, memory coupled with the processor, and instructions stored in the memory. The instructions may be executable by the processor to cause the apparatus to receive an uplink grant that indicates scheduling information for an uplink shared channel transmission by the UE, the scheduling information including a first set of uplink resources and a second set of uplink resources, determine whether a downlink grant scheduling feedback information to be piggybacked on the uplink shared channel transmission has been received after the uplink grant, select one of the first set of uplink resources or the second set of uplink resources based on the determining, and perform the uplink shared channel transmission using the selected one of the first set of uplink resources or the second set of uplink resources.

Another apparatus for wireless communications at a UE is described. The apparatus may include means for receiving an uplink grant that indicates scheduling information for an uplink shared channel transmission by the UE, the scheduling information including a first set of uplink resources and a second set of uplink resources, determining whether a downlink grant scheduling feedback information to be piggybacked on the uplink shared channel transmission has been received after the uplink grant, selecting one of the first set of uplink resources or the second set of uplink resources based on the determining, and performing the uplink shared channel transmission using the selected one of the first set of uplink resources or the second set of uplink resources.

A non-transitory computer-readable medium storing code for wireless communications at a UE is described. The code may include instructions executable by a processor to receive an uplink grant that indicates scheduling information for an uplink shared channel transmission by the UE, the scheduling information including a first set of uplink resources and a second set of uplink resources, determine whether a downlink grant scheduling feedback information to be piggybacked on the uplink shared channel transmission has been received after the uplink grant, select one of the first set of uplink resources or the second set of uplink resources based on the determining, and perform the uplink shared channel transmission using the selected one of the first set of uplink resources or the second set of uplink resources.

In some examples of the method, apparatuses, and non-transitory computer-readable medium described herein, the selecting may include operations, features, means, or instructions for selecting the second set of uplink resources based on determining that the downlink grant scheduling feedback information to be piggybacked on the uplink shared channel transmission may have been received after the uplink grant.

Some examples of the method, apparatuses, and non-transitory computer-readable medium described herein may further include operations, features, means, or instructions for selecting the first set of uplink resources based on determining that no downlink grant scheduling feedback information to be piggybacked on the uplink shared channel transmission may have been received after the uplink grant.

In some examples of the method, apparatuses, and non-transitory computer-readable medium described herein, receiving the uplink grant may include operations, features, means, or instructions for receiving an explicit indication of the first set of uplink resources and the second set of uplink resources in the uplink grant.

In some examples of the method, apparatuses, and non-transitory computer-readable medium described herein, receiving the uplink grant may include operations, features, means, or instructions for receiving an explicit indication of the first set of uplink resources in the uplink grant, and determining the second set of uplink resources based on the first set of uplink resources.

In some examples of the method, apparatuses, and non-transitory computer-readable medium described herein, the first set of uplink resources includes a first set of orthogonal frequency division multiplexing symbols and the second set of uplink resources includes a second set of orthogonal frequency division multiplexing symbols.

Some examples of the method, apparatuses, and non-transitory computer-readable medium described herein may further include operations, features, means, or instructions for determining a beginning of the second set of orthogonal frequency division multiplexing symbols based on an end of the first set of orthogonal frequency division multiplexing symbols.

Some examples of the method, apparatuses, and non-transitory computer-readable medium described herein may further include operations, features, means, or instructions for determining a number of the second set of orthogonal frequency division multiplexing symbols based on a number of the first set of orthogonal frequency division multiplexing symbols.

In some examples of the method, apparatuses, and non-transitory computer-readable medium described herein, a number of resource blocks in the second set of uplink resources may be greater than a number of resource blocks in the first set of uplink resources.

Some examples of the method, apparatuses, and non-transitory computer-readable medium described herein may further include operations, features, means, or instructions for determining a number of feedback information bits associated with a number of downlink grants received after the uplink grant, and where the second set of uplink resources may be determined based on the number of feedback information bits.

A method of wireless communications at a UE is described. The method may include receiving an uplink grant that indicates scheduling information for an uplink shared channel transmission for the UE, receiving, after receiving the uplink grant, a downlink grant scheduling feedback information to be piggybacked on the uplink shared channel transmission, determining based on the downlink grant, that a feedback piggybacking condition is satisfied, and performing the uplink shared channel transmission based on the determining, where the uplink shared channel transmission includes the feedback information.

An apparatus for wireless communications at a UE is described. The apparatus may include a processor, memory coupled with the processor, and instructions stored in the memory. The instructions may be executable by the processor to cause the apparatus to receive an uplink grant that indicates scheduling information for an uplink shared channel transmission for the UE, receive, after receiving the uplink grant, a downlink grant scheduling feedback information to be piggybacked on the uplink shared channel transmission, determine based on the downlink grant, that a feedback piggybacking condition is satisfied, and perform the uplink shared channel transmission based on the determining, where the uplink shared channel transmission includes the feedback information.

Another apparatus for wireless communications at a UE is described. The apparatus may include means for receiving an uplink grant that indicates scheduling information for an uplink shared channel transmission for the UE, receiving, after receiving the uplink grant, a downlink grant scheduling feedback information to be piggybacked on the uplink shared channel transmission, determining based on the downlink grant, that a feedback piggybacking condition is satisfied, and performing the uplink shared channel transmission based on the determining, where the uplink shared channel transmission includes the feedback information.

A non-transitory computer-readable medium storing code for wireless communications at a UE is described. The code may include instructions executable by a processor to receive an uplink grant that indicates scheduling information for an uplink shared channel transmission for the UE, receive, after receiving the uplink grant, a downlink grant scheduling feedback information to be piggybacked on the uplink shared channel transmission, determine based on the downlink grant, that a feedback piggybacking condition is satisfied, and perform the uplink shared channel transmission based on the determining, where the uplink shared channel transmission includes the feedback information.

In some examples of the method, apparatuses, and non-transitory computer-readable medium described herein, determining that the feedback piggybacking condition may be satisfied may include operations, features, means, or instructions for determining that the feedback information may be associated with a priority level for which feedback piggybacking may be permitted.

In some examples of the method, apparatuses, and non-transitory computer-readable medium described herein, the feedback information may include operations, features, means, or instructions for a second high priority communication or a low priority communication.

In some examples of the method, apparatuses, and non-transitory computer-readable medium described herein, determining that the feedback piggybacking condition may be satisfied may include operations, features, means, or instructions for determining that a downlink control information format associated with the downlink grant includes a downlink assignment index information field.

In some examples of the method, apparatuses, and non-transitory computer-readable medium described herein, determining that the feedback piggybacking condition may be satisfied may include operations, features, means, or instructions for determining that a downlink assignment index field may be not present in a downlink control information format associated with the downlink grant and that a number of feedback bits associated with the downlink shared channel transmission may be less than a threshold.

In some examples of the method, apparatuses, and non-transitory computer-readable medium described herein, determining that the feedback piggybacking condition may be satisfied may include operations, features, means, or instructions for determining that the uplink grant was received prior to the downlink grant and no other downlink grant was received scheduling feedback information to be piggybacked on the uplink shared channel transmission prior to the uplink grant.

In some examples of the method, apparatuses, and non-transitory computer-readable medium described herein, the feedback piggybacking condition may be based on a timing of the uplink grant with respect to the downlink grant.

In some examples of the method, apparatuses, and non-transitory computer-readable medium described herein, the downlink grant includes one or more of: scheduling information for a downlink shared channel transmission to the UE, an indication of a semi-persistent scheduling downlink shared channel transmission release, an indication of a secondary cell dormancy without scheduling a physical downlink shared channel reception.

In some examples of the method, apparatuses, and non-transitory computer-readable medium described herein, determining that the feedback piggybacking condition may be satisfied may include operations, features, means, or instructions for determining that aperiodic channel state information (A-CSI) is absent from the uplink shared channel transmission.

A method of wireless communications at a base station is described. The method may include transmitting an uplink grant that indicates scheduling information for an uplink shared channel transmission by a UE, the scheduling information including a first set of uplink resources and a second set of uplink resources, transmitting, after transmitting the uplink grant, a downlink grant scheduling feedback information to be piggybacked on the uplink shared channel transmission, and receiving the uplink shared channel transmission, where the uplink shared channel transmission includes feedback information for the downlink shared channel transmission over the second set of uplink resources.

An apparatus for wireless communications at a base station is described. The apparatus may include a processor, memory coupled with the processor, and instructions stored in the memory. The instructions may be executable by the processor to cause the apparatus to transmit an uplink grant that indicates scheduling information for an uplink shared channel transmission by a UE, the scheduling information including a first set of uplink resources and a second set of uplink resources, transmit, after transmitting the uplink grant, a downlink grant scheduling feedback information to be piggybacked on the uplink shared channel transmission, and receive the uplink shared channel transmission, where the uplink shared channel transmission includes feedback information for the downlink shared channel transmission over the second set of uplink resources.

Another apparatus for wireless communications at a base station is described. The apparatus may include means for transmitting an uplink grant that indicates scheduling information for an uplink shared channel transmission by a UE, the scheduling information including a first set of uplink resources and a second set of uplink resources, transmitting, after transmitting the uplink grant, a downlink grant scheduling feedback information to be piggybacked on the uplink shared channel transmission, and receiving the uplink shared channel transmission, where the uplink shared channel transmission includes feedback information for the downlink shared channel transmission over the second set of uplink resources.

A non-transitory computer-readable medium storing code for wireless communications at a base station is described. The code may include instructions executable by a processor to transmit an uplink grant that indicates scheduling information for an uplink shared channel transmission by a UE, the scheduling information including a first set of uplink resources and a second set of uplink resources, transmit, after transmitting the uplink grant, a downlink grant scheduling feedback information to be piggybacked on the uplink shared channel transmission, and receive the uplink shared channel transmission, where the uplink shared channel transmission includes feedback information for the downlink shared channel transmission over the second set of uplink resources.

In some examples of the method, apparatuses, and non-transitory computer-readable medium described herein, transmitting the uplink grant may include operations, features, means, or instructions for transmitting an explicit indication of the first set of uplink resources and the second set of uplink resources in the uplink grant.

In some examples of the method, apparatuses, and non-transitory computer-readable medium described herein, transmitting the uplink grant may include operations, features, means, or instructions for transmitting an explicit indication of the first set of uplink resources in the uplink grant; where the second set of uplink resources may be implicit from the first set of uplink resources.

In some examples of the method, apparatuses, and non-transitory computer-readable medium described herein, the first set of uplink resources includes a first set of orthogonal frequency division multiplexing symbols and the second set of uplink resources includes a second set of orthogonal frequency division multiplexing symbols.

A method of wireless communications at a base station is described. The method may include transmitting an uplink grant that indicates scheduling information for an uplink shared channel transmission for a UE, transmitting, after transmitting the uplink grant, a downlink grant scheduling feedback information to be piggybacked on the uplink shared channel transmission, and receiving the uplink shared channel transmission, where the uplink shared channel transmission includes feedback information for the downlink shared channel transmission based on a feedback piggybacking condition being satisfied.

An apparatus for wireless communications at a base station is described. The apparatus may include a processor, memory coupled with the processor, and instructions stored in the memory. The instructions may be executable by the processor to cause the apparatus to transmit an uplink grant that indicates scheduling information for an uplink shared channel transmission for a UE, transmit, after transmitting the uplink grant, a downlink grant scheduling feedback information to be piggybacked on the uplink shared channel transmission, and receive the uplink shared channel transmission, where the uplink shared channel transmission includes feedback information for the downlink shared channel transmission based on a feedback piggybacking condition being satisfied.

Another apparatus for wireless communications at a base station is described. The apparatus may include means for transmitting an uplink grant that indicates scheduling information for an uplink shared channel transmission for a UE, transmitting, after transmitting the uplink grant, a downlink grant scheduling feedback information to be piggybacked on the uplink shared channel transmission, and receiving the uplink shared channel transmission, where the uplink shared channel transmission includes feedback information for the downlink shared channel transmission based on a feedback piggybacking condition being satisfied.

A non-transitory computer-readable medium storing code for wireless communications at a base station is described. The code may include instructions executable by a processor to transmit an uplink grant that indicates scheduling information for an uplink shared channel transmission for a UE, transmit, after transmitting the uplink grant, a downlink grant scheduling feedback information to be piggybacked on the uplink shared channel transmission, and receive the uplink shared channel transmission, where the uplink shared channel transmission includes feedback information for the downlink shared channel transmission based on a feedback piggybacking condition being satisfied.

In some examples of the method, apparatuses, and non-transitory computer-readable medium described herein, the feedback piggybacking condition may be based on a priority level of the feedback information.

In some examples of the method, apparatuses, and non-transitory computer-readable medium described herein, the feedback information may include operations, features, means, or instructions for a second high priority communication or a low priority communication.

In some examples of the method, apparatuses, and non-transitory computer-readable medium described herein, the feedback piggybacking condition may be based on a downlink control information format associated with the downlink grant.

In some examples of the method, apparatuses, and non-transitory computer-readable medium described herein, the feedback piggybacking condition may be based on a presence or absence of a downlink assignment index field in a downlink control information format associated with the downlink grant and a number of feedback bits associated with the downlink shared channel transmission.

In some examples of the method, apparatuses, and non-transitory computer-readable medium described herein, the downlink grant includes one or more of: scheduling information for a downlink shared channel transmission to the UE, an indication of a semi-persistent scheduling downlink shared channel transmission release, an indication of a secondary cell dormancy without scheduling a physical downlink shared channel reception.

In some examples of the method, apparatuses, and non-transitory computer-readable medium described herein, feedback piggybacking condition may be based on an absence of A-CSI in the uplink shared channel transmission.

DETAILED DESCRIPTION

Figure 1:
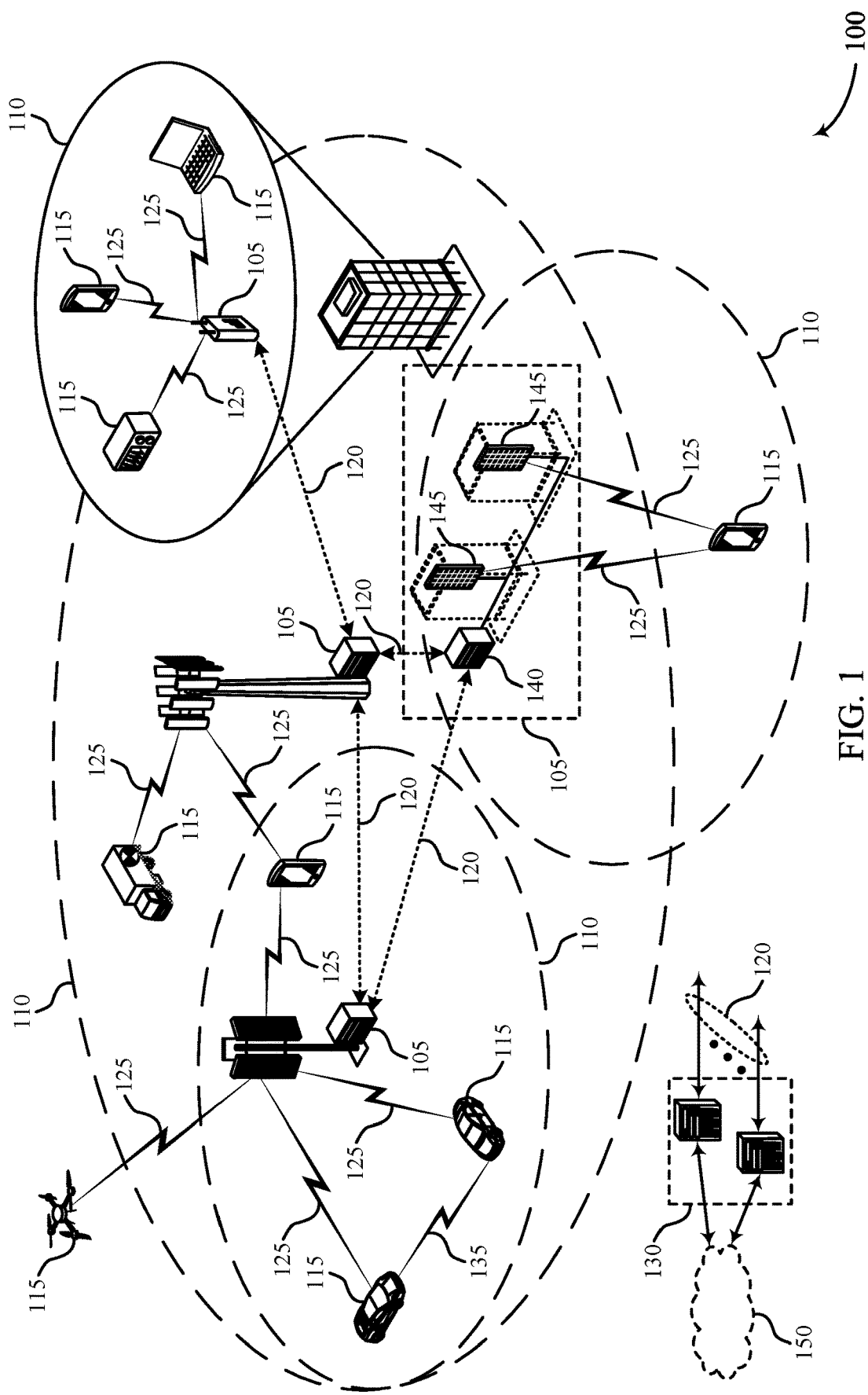
FIG. 1 illustrates an example of a wireless communications system that supports uplink shared channel feedback piggybacking in accordance with aspects of the present disclosure.

A user equipment (UE) may transmit feedback information to a base station based on successful or unsuccessful reception and decoding of a downlink transmission from the base station. A base station may initially schedule resources for a downlink transmission in a physical downlink shared channel (PDSCH) from the base station by transmitting a downlink grant to the UE indicating the resources. The UE may then monitor the resources, and may transmit feedback information based on a successful or unsuccessful reception of the downlink transmission. The UE may transmit the feedback information in a physical uplink control channel (PUCCH) transmission to the base station.

The UE may receive an uplink grant scheduling hybrid automatic repeat request (HARQ) feedback in a physical uplink control channel (PUCCH). The UE may also receive an uplink grant scheduling other transmissions in a physical uplink shared channel (PUSCH). In some cases, the PUCCH may be scheduled for a time later than the PUSCH. Therefore, in cases of high priority transmissions, the UE may use the PUSCH as an earlier opportunity to transmit feedback information, rather than waiting to transmit the feedback information in the later allocated PUCCH.

The UE may preempt the earlier PUSCH, in cases where the PUSCH has a lower priority than the HARQ feedback. The UE may "piggyback" the HARQ feedback for the later downlink data transmission in the scheduled PUSCH. However, as the uplink grant scheduling the PUSCH transmission comes after the downlink grant scheduling the PDSCH transmission, on which the feedback information is based, the PUSCH may not include resources for the feedback information, and the piggybacking may lead to puncturing of the PUSCH transmission. The priority of the HARQ feedback may be determined based on a priority level of the associated downlink transmission.

In order to avoid such puncturing, which may result in other lost transmission information, the UE may determine resources on which to transmit the feedback information additionally to the PUSCH resources, or may selectively determine in what cases to transmit the feedback information.

The UE may determine two sets of resources for PUSCH transmission. If the UE does not have a HARQ feedback to piggyback on to the PUSCH, the UE may use the first set of resources for PUSCH transmission. If the UE does transmit the feedback information in the PUSCH, then the UE may transmit the PUSCH in the second set of resources along with the feedback information.

The two sets of PUSCH resources may be explicitly indicated in the uplink grant. Additionally or alternatively, the second set of resources may be derived based on the first set of resources that are indicated in an uplink grant.

In another case, the UE may determine to piggyback the late feedback based on a set of conditions. For example, the UE may determine to piggyback the later feedback in cases where the PUSCH is a particular type of communication (e.g., a higher priority communication). The UE may also determine to piggyback the feedback based on the format type of the downlink control information (DCI) that indicates the downlink grant, or based on other conditions, or a combination of these.

Aspects of the disclosure are initially described in the context of wireless communications systems. Aspects of the disclosure are then described in the context of a timeline and process flow diagrams. Aspects of the disclosure are further illustrated by and described with reference to apparatus diagrams, system diagrams, and flowcharts that relate to uplink shared channel feedback piggybacking.

FIG. 1 illustrates an example of a wireless communications system 100 that supports uplink shared channel feedback piggybacking in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$, seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In first case, a UE 115 may receive an uplink grant from a base station 105 that indicates scheduling information for an uplink shared channel transmission by the UE 115, the scheduling information including a first set of uplink resources and a second set of uplink resources. The UE 115 may determine whether a downlink grant scheduling feedback information to be piggybacked on the uplink shared channel transmission has been received after the uplink grant. The UE 115 may select one of the first set of uplink resources of the second set of uplink resources based on the determining. The UE 115 may perform the uplink shared channel transmission using the selected one of the first set of uplink resources of the second set of uplink resources.

In a second case, a UE 115 may receive an uplink grant from a base station 105 that indicates scheduling information for an uplink shared channel transmission for the UE 115. The UE 115 may also receive from the base station 105, after receiving the uplink grant, a downlink grant scheduling feedback information to be piggybacked on the uplink shared channel transmission. The UE 115 may determine, based on the downlink grant, that a feedback piggybacking condition is satisfied. The UE 115 may perform the uplink shared channel transmission based on the determining, where the uplink shared channel transmission includes the feedback information.

Figure 2:
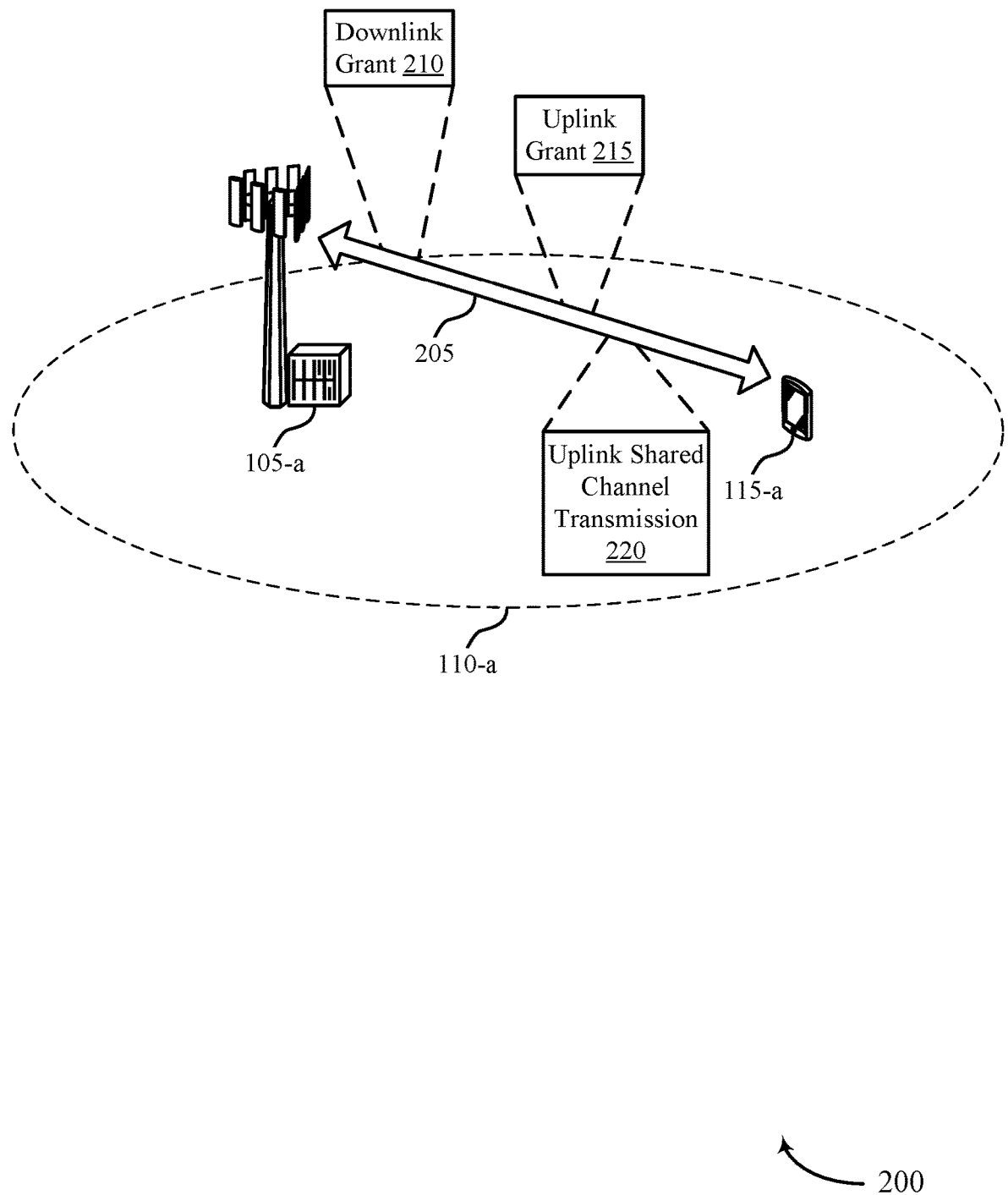
FIG. 2 illustrates an example of a wireless communications system that supports uplink shared channel feedback piggybacking in accordance with aspects of the present disclosure.

FIG. 2 illustrates an example of a wireless communications system 200 that supports uplink shared channel feedback piggybacking in accordance with aspects of the present disclosure. In some examples, wireless communications system 200 may implement aspects of wireless communication system 100. UE 115-b may be an example of a UE 115 as described with respect to FIG. 1, and base station 105 be may be an example of a base station 105 as described with respect to FIG. 2.

Base station 105-a may serve a coverage area 110-a, which may include UE 115-a. Base station 105-a and UE 115-a may communicate over communication link 205. Base station 105-a may transmit a downlink grant 210 to UE 115-a. Downlink grant 210 may include resources indicating an upcoming downlink transmission from base station 105-a, such as a physical downlink shared channel (PDSCH) message. UE 115-a may then monitor the indicated resources for the PDSCH message, and attempt to decode the message. Based on monitoring the resources and attempted decoding, UE 115-a may generate feedback information for the PDSCH. The feedback information may be transmitted by UE 115-a in an uplink message. For example, UE 115-a may transmit HARQ feedback, such as an acknowledgment (ACK), or a negative acknowledgment (NACK). An ACK may be transmitted based on a successful reception and decoding of a message from base station 105-a, and a NACK may be transmitted based on unsuccessful reception or decoding of the PDSCH transmission. The feedback information may be transmitted in a PUCCH scheduled by an uplink grant transmitted to UE 115-a by base station 105-a.

Base station 105-a may transmit an uplink grant 215 to UE 115-a over communication link 205. Uplink grant 215 may schedule a set of uplink resources for UE 115-a to use to transmit uplink shared channel transmission 220 (e.g., a PUSCH transmission). In some cases, UE 115-a may piggyback feedback information (e.g., an ACK/NACK for the downlink shared channel transmission) in the uplink shared channel transmission 220, rather than transmitting the feedback information in a PUCCH scheduled by a different uplink grant, where the PUCCH is scheduled for after the PUSCH.

When base station 105-a schedules resources for uplink shared channel transmission 220 in uplink grant 215, base station 105-a may not take feedback piggybacking into consideration, resulting in insufficient resources for both the PUSCH data in uplink shared channel transmission 220 and the piggybacked feedback information. In some cases, this may result in puncturing or rate matching the uplink shared channel transmission 220 data to accommodate the piggybacked feedback. Thus, the piggybacking of feedback on uplink shared channel transmission 220 may increase latency or damage the performance and efficiency of the uplink shared channel transmission 220.

In order to allow feedback piggybacking on the uplink shared channel, in one case UE 115-a may determine two sets of resources for uplink shared channel transmission 220. For example, if UE 115-a determines not to piggyback feedback on the uplink shared channel transmission 220, then UE 115-a may use a first set of resources. If UE 115-a determines to piggyback a feedback onto uplink shared channel transmission 220, then UE 115-a may transmit the uplink shared channel transmission 220 with the feedback information on the second set of resources.

The two sets of resources may be configured and allocated in the uplink grant, or the first set of resources (e.g., non-piggybacking set of resources) may be configured in the uplink grant, and the second set of resources may be derived by UE 115-a. The second set of resources may include additional time or frequency resources, or both, that are added to the uplink shared channel transmission 220, on which UE 115-a may transmit the piggybacked feedback information.

In another case, UE 115-a may determine whether to piggyback the late feedback information based on a number of conditions, and based on whether the conditions are met. For example, the conditions may include the type or priority level of the downlink transmission that the feedback information is based on, the DCI format of the downlink grant, the presence of downlink assignment index (DAI) field in the uplink or downlink grant, or the timing of the uplink or downlink grants, or a combination of these conditions.

Figure 3:
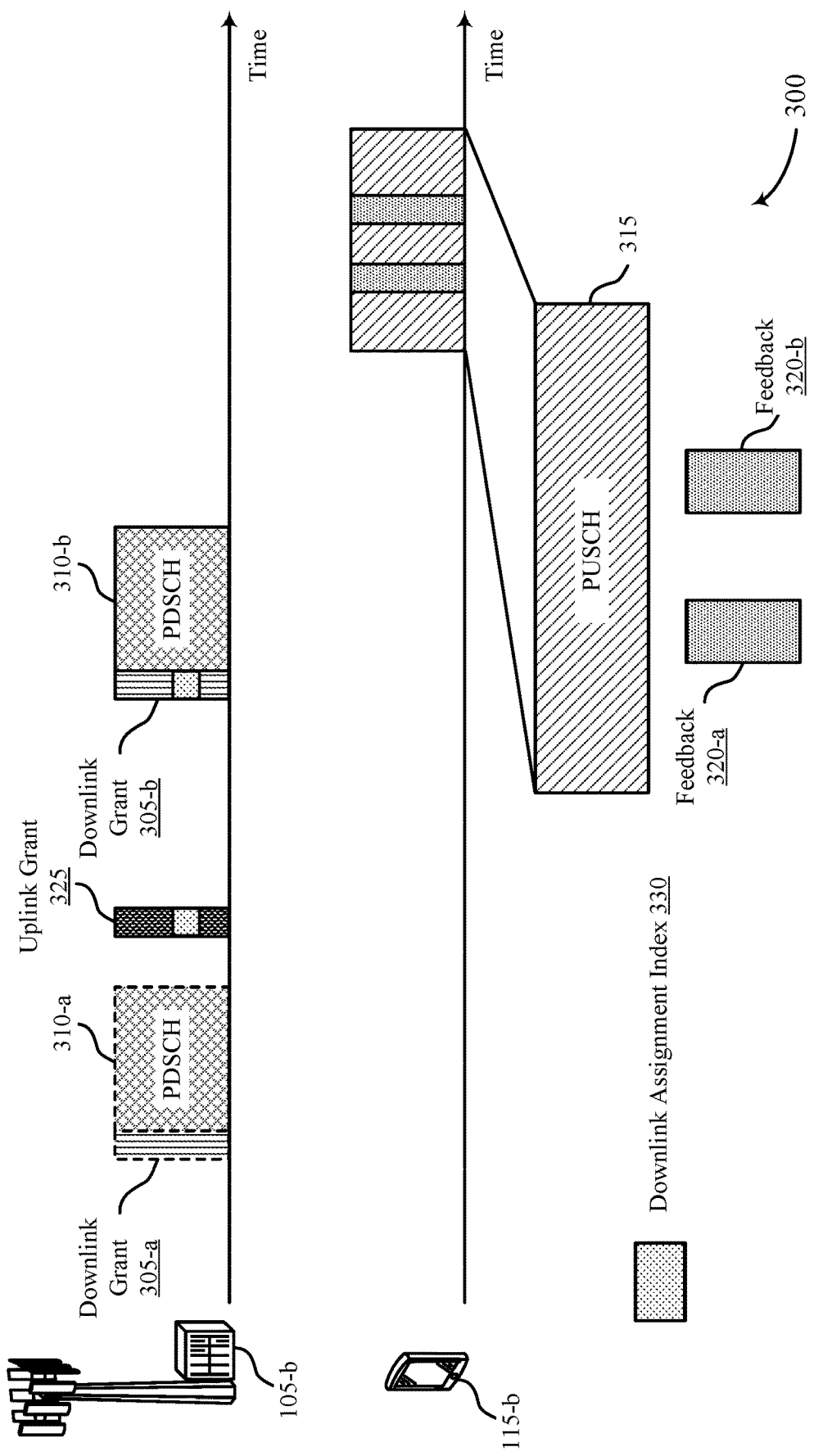
FIG. 3 illustrates an example of a timeline that supports uplink shared channel feedback piggybacking in accordance with aspects of the present disclosure.

FIG. 3 illustrates an example of a timeline 300 that supports uplink shared channel feedback piggybacking in accordance with aspects of the present disclosure. In some examples, timeline 300 may implement aspects of wireless communication system 100 or 200. The timeline 300 illustrates example transmissions from a base station 105-b and UE 115-b, which may be examples of the corresponding devices described with reference to FIGS. 1 and 2. The transmissions may include downlink transmissions from the base station 105-b to the UE 115-b and uplink transmissions from UE 115-b to base station 105-b. Downlink grants 305, PDSCH transmissions 310, PUSCH transmission 315, and feedback information 320 may be examples of the corresponding communications as described with reference to FIG. 2.

Base station 105-b may transmit downlink grants 305-a and 305-b and corresponding PDSCH transmissions 310-a and 310-b to UE 115-b. In some cases, base station 105-b may only transmit one of downlink grants 305 and corresponding PDSCH transmissions 310 (e.g., downlink grant 305-b and PDSCH transmission 310-b). Downlink grants 305 may include scheduling information for a downlink shared channel transmission (e.g., for a PDSCH 310) to a UE 115, an indication of a semi-persistent scheduling downlink shared channel transmission release, or an indication of a secondary cell dormancy without scheduling a physical downlink shared channel reception. The semi-persistent scheduling downlink shared channel transmission release may include a release message which releases one or more semi-persistent scheduling downlink shared channel configurations. The secondary cell dormancy may mean that the secondary cell is not an active cell.

Base station 105-*b* may transmit PDSCH transmissions 310 (e.g., indicated by corresponding downlink grants 305). UE 115-*b* may monitor the resources associated with PDSCH transmissions 310 according to corresponding downlink grants 305. UE 115-*b* may generate feedback information 320-*a* indicating whether UE 115-*b* successfully receives and decodes PDSCH transmission 310-*a* and feedback information 320-*b* indicating whether UE 115-*b* successfully receives and decodes PDSCH transmission 310-*b*. In the case that base station 105-*b* only transmitted downlink grant 305-*b* and PDSCH transmission 310-*b*, UE 115-*b* may not transmit feedback information 320-*a*. In some cases, UE 115-*b* may transmit (e.g., piggyback) feedback information 320 in a PUCCH transmission (not shown) indicated by an uplink grant 325. Uplink grant 325 may include uplink DAI bits 330.

UE 115-*b* may generate feedback information 320 based on a codebook associated with feedback information 320. The codebook for feedback information 320 may be specific to each feedback information 320. For example, feedback information 320-*a* may be associated with a different codebook than feedback information 320-*b*. UE 115-*b* may determine a size of the codebook for feedback information 320-*a* which may enable the base station 105-*b* to decode PUSCH transmissions 315 and the feedback information 320-*a*. If UE 115-*b* incorrectly determines the size of the codebook for feedback information 320-*a*, there may be misalignment of the size of the feedback information 320-*a* and base station 105-*b* may not correctly receive or decode the feedback information 320-*a* within the resources of the PUSCH transmission 315.

In some cases, UE 115-*b* may puncture PUSCH transmission 315 with feedback information 320-*b*, in some examples where the PUSCH transmission 315 occurs before the PUCCH (in which UE 115-*b* may otherwise transmit feedback information 320-*b*). By puncturing PUSCH transmission 315 with feedback information 320-*b* (e.g., piggybacking), UE 115-*b* may decrease the performance of PUSCH transmission 315 (e.g., decrease a total amount of power or resources associated with PUSCH transmission 315), since base station 105-*b* may not provide resources for feedback information 320-*b* at a time when it schedules PUSCH transmission 315 (e.g., with the transmission of uplink grant 325).

In order to allow feedback information 320-*b* piggybacking on PUSCH transmission 315 without damaging efficiency of the PUSCH transmission 315 transmission, in one case UE 115-*b* may determine two sets of resources for the PUSCH transmission 315. For example, if UE 115-*b* determines not to piggyback a feedback information 320-*b* on PUSCH transmission 315, then UE 115-*b* may use a first set of resources for PUSCH transmission 315 (e.g., a first set of OFDM symbols and resource blocks). If UE 115-*b* determines to piggyback feedback information 320-*b* onto PUSCH transmission 315, then UE 115-*b* may transmit the PUSCH transmission 315 with the feedback information 320-*b* on the second set of resources.

The two sets of resources may be configured and allocated in uplink grant 325. Alternatively, the first set of resources (e.g., non-piggybacking set of resources) may be configured in uplink grant 325, and the second set of resources may be derived by UE 115-*b*. For example, UE 115-*b* may derive the second set of resources as a set of resources including a higher number of OFDM symbols than the first set of resources, where the OFDM symbols for the second set of resources (e.g., for the piggybacked feedback information 320-*b*) occur right after the OFDM symbols for the scheduled PUSCH transmission 315 resources indicated in uplink grant 325. Additionally or alternatively, the second set of resources may include the same number of OFDM symbols as the OFDM symbols of the first set of resources, but the second set of resources may have more resources blocks (e.g., frequency resources) than the first set of resources. The derivation of the second set of resources by UE 115-*b* may also depend on the number of feedback information bits of feedback information 320-*b* that are to be piggybacked on PUSCH transmission 315. For example, the more bits in feedback information 320-*b* that are to be piggybacked, the more resources may be derived or added by UE 115-*b* as the second set of resources in addition to the first set of resources.

In another case, UE 115-*b* may determine whether to piggyback feedback information 320-*b* based on a number of conditions, and based on whether the conditions are met. In one case, UE 115-*b* may determine whether to piggyback feedback information 320-*b* on PUSCH transmission 315 based on a priority of PDSCH transmission 310-*b*. Further, the feedback information 320-*b* may be piggybacked when the feedback information 320-*b* itself is associated with a high priority, such as when the feedback information 320-*b* is a URLLC or other high priority communication. For example, feedback information 320-*b* may be piggybacked on PUSCH transmission 315 in cases where feedback information 320-*b* is associated with a high priority downlink transmission, such as an URLLC downlink transmission. In some cases, a priority level of the PUSCH transmission 315 may also be taken into consideration. For example, the feedback information 320-*b* may be piggybacked on the PUSCH transmission 315 when a priority of the feedback information 320-*b* is greater than a set threshold or greater than a priority of the PUSCH transmission 315, such as if the feedback information 320-*b* is considered a URLLC transmission and the PUSCH transmission 315 is considered an eMBB transmission. In some cases, the feedback information 320-*b* may be piggybacked on the PUSCH transmission 315 if a priority of the feedback information 320-*b* is equal to a priority level of the PUSCH transmission 315, such as if both the feedback information 320-*b* and the PUSCH transmission 315 are URLLC transmissions.

Additionally or alternatively, the piggybacking feedback information 320-*b* may be based on the condition of the type of downlink DCI format or the presence of DAI bits 330 in uplink grant 325 or downlink grant, or a combination of these. For example, piggybacking of feedback information 320-*b* may be allowed in cases where the downlink grants 305 are scheduled by a DCI format that has a DAI field (e.g., a counter DAI or a total DAI). However, if downlink grant 305-*b* does not have a DAI field, then at most one or two bits of feedback information 320-*b* may be piggybacked on PUSCH transmission 315. In this case, the feedback information 320-*b* may puncture the PUSCH transmission 315.

Additionally or alternatively, feedback information 320-*b* may be piggybacked on PUSCH transmission 315 if no downlink grant 305 is received by UE 115-*b* before uplink grant 325. Downlink grant 305 may schedule other downlink transmission from a base station 105, which may thus include additional information that may correspond to feedback information transmission, for which feedback information to be piggybacked onto PUSCH transmission 315, and as such, feedback information 320-*b* may be piggybacked on PUSCH transmission 315 if no downlink grant 305 is received by UE 115-*b* before uplink grant 325. Feedback information 320-*b* may also be piggybacked on the PUSCH transmission 315 if the PUSCH transmission 315 does not carry CSI, such as aperiodic-CSI (A-CSI). If A-CSI is piggybacked onto the PUSCH transmission 315, the mapping of the A-CSI to the PUSCH 315 may be affected by the feedback information 320-*b*. In some cases, if downlink grant 305 is received late, the UE 115 may not have sufficient processing time to revise the processing of the A-CSI. Thus, feedback information 320-*b* may be piggybacked in cases where the PUSCH transmission 315 does not carry A-CSI.

If no conditions described herein are satisfied, then there may be an error case. In this situation, UE 115-*b* may not expect to be scheduled with downlink grant 305-*b* after the uplink grant 325. As such, UE 115-*b* would not have information about an upcoming PDSCH transmission 310-*b* based on which to generate feedback information 320-*b*. Alternatively, if no conditions are satisfied, or if the feedback information 320-*b* has the same priority as the PUSCH transmission 315, the UE 115-*b* may drop the transmission of PUSCH transmission 315, and UE 115-*b* may transmit the feedback information 320-*b* on a PUCCH transmission (not shown). Alternatively, if the later PUCCH has a higher priority than the feedback information 320-*b*, the feedback information 320-*b* may be delayed or dropped, or the corresponding PUSCH transmission 315 may de dropped, or a combination of these.

Figure 4:
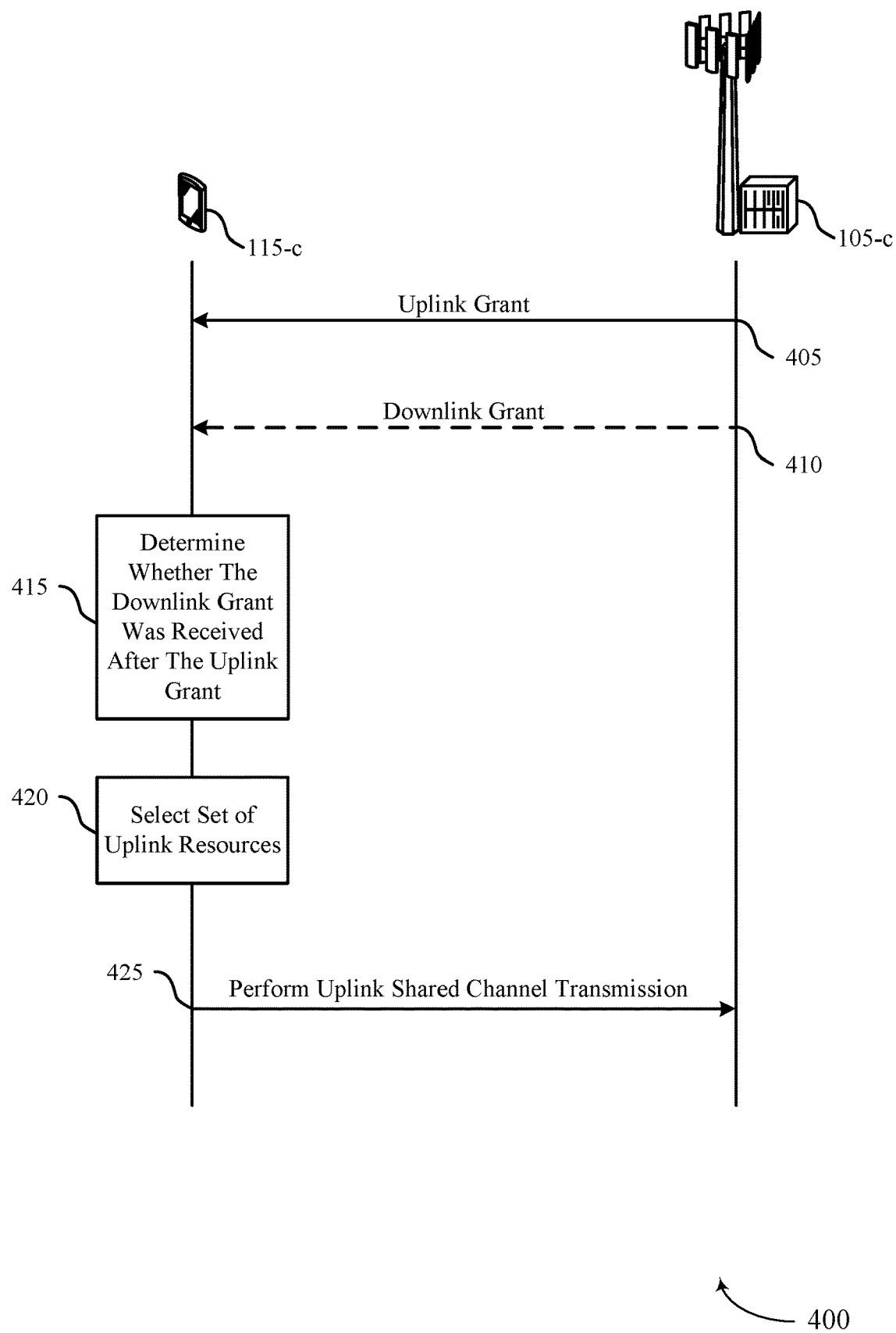
FIG. 4 illustrates an example of a process flow that supports uplink shared channel feedback piggybacking in accordance with aspects of the present disclosure.

FIG. 4 illustrates an example of a process flow 400 that supports uplink shared channel feedback piggybacking in accordance with aspects of the present disclosure. In some examples, process flow 400 may implement aspects of wireless communication systems 100 and 200. UE 115-*c* may be an example of a UE 115 as described with respect to FIGS. 1-3, and base station 105-*c* may be an example of a base station 105 as described with respect to FIGS. 1-3.

At 405, UE 115-*c* may receive an uplink grant from base station 105-*c*. UE 115-*c* may receive an uplink grant that indicates scheduling information for an uplink shared channel transmission by UE 115-*c*, where the scheduling information may include a first set of uplink resources and a second set of uplink resources UE 115-*c* may receive an explicit indication of the first set of uplink resources and the second set of uplink resources.

Additionally or alternatively, UE 115-*c* may receive an explicit indication of the first set of uplink resources in the uplink grant, and may determine the second set of uplink resources based on the first set of uplink resources. Base station 105-*c* may transmit an explicit indication of the first set of uplink resources, and the second set of uplink resources may be implicit from the first set of uplink resources. The first set of uplink resources may include a first set of OFDM symbols, and the second set of uplink resources may include a second set of OFDM symbols. A number of resources blocks in the second set of uplink resources may be greater than a number of resource blocks in the first set of uplink resources.

In some cases, UE 115-*c* may determine a beginning of the second set of OFDM symbols based on an end of the first set of OFDM symbols. UE 115-*c* may also determine a number of the second set of OFDM symbols based on a number of the first set of OFDM symbols.

UE 115-*c* may determine a number of feedback information bits associated with a number of downlink grants received after the uplink grant, where the second set of uplink resources may be determined based on the number of feedback information bits.

In some cases, at 410, UE 115-*c* may receive a downlink grant from base station 105-*c*. At 415, UE 115-*c* may determine whether a downlink grant scheduling feedback information to be piggybacked on the uplink shared channel transmission has been received after the uplink grant.

At 420, UE 115-*c* may select one of the first set of uplink resources or the second set of uplink resources based on the determining at 415. UE 115-*c* may select the second set of uplink resources based on determining that the downlink grant scheduling feedback information to be piggybacked on the uplink shared channel transmission has been received after the uplink grant. Alternatively, UE 115-*c* may select the first set of uplink resources based on determining that no downlink grant scheduling feedback information to be piggybacked on the uplink shared channel transmission was received after the uplink grant.

At 425, UE 115-*c* may perform the uplink shared channel transmission using the selected one of the first set of uplink resources or the second set of uplink resources.

Figure 5:
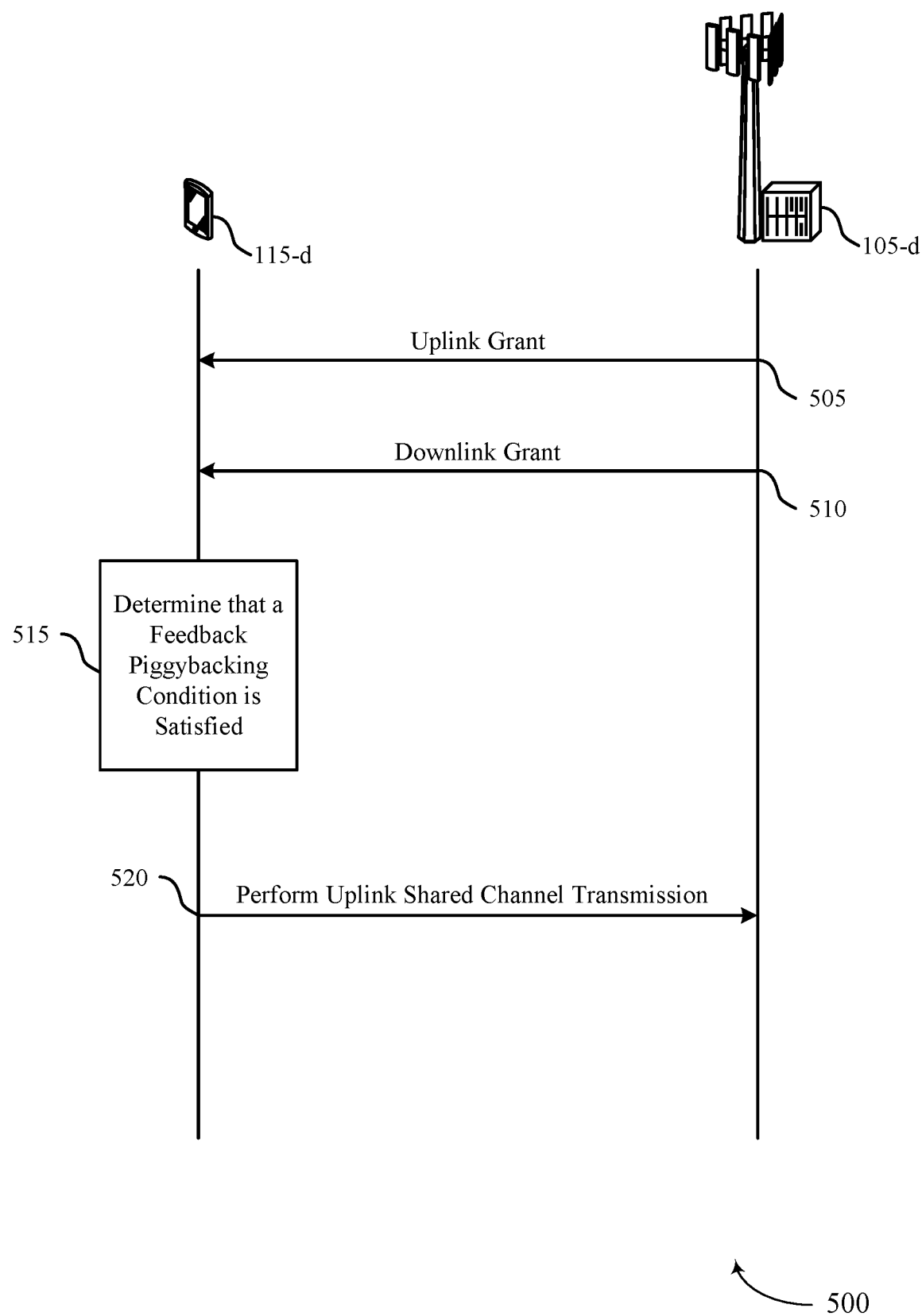
FIG. 5 illustrates an example of a process flow that supports uplink shared channel feedback piggybacking in accordance with aspects of the present disclosure.

FIG. 5 illustrates an example of a process flow 500 that supports uplink shared channel feedback piggybacking in accordance with aspects of the present disclosure. In some examples, process flow 500 may implement aspects of wireless communication system 100. UE 115-*d* may be an example of a UE 115 as described with reference to FIGS. 1-4, and base station 105-*d* may be an example of a base station 105 as described with reference to FIGS. 1-4.

In some cases, UE 115-*d* may determine to piggyback late feedback information in cases where certain conditions apply. At 505, UE 115-*d* may receive an uplink grant that indicates scheduling information for an uplink shared channel transmission for UE 115-*d*.

At 510, UE 115-*d* may receive, after receiving the uplink grant, a downlink grant scheduling feedback information to be piggybacked on the uplink shared channel transmission.

At 515, UE 115-*d* may determine, based on the downlink grant, that a feedback piggybacking condition is satisfied. In some cases, UE 115-*d* may determine that the feedback information may be associated with a priority level for which feedback piggybacking is permitted. The feedback information may include a first high priority communication, and uplink shared channel transmission may include one or more of: a second high priority communication or a low priority communication. A low priority level may be associated with a priority index 0, and a high priority level may be associated with a priority index 1. For example, UE 115-*d* may piggyback late feedback information when the feedback information include URLLC communications, or where the feedback information applies to a PDSCH including eMBB or URLLC communications, or other high priority or low latency communications. In some cases, UE 115-*d* may determine not to piggyback a low priority feedback information transmission which the PUSCH contains higher priority transmissions.

UE 115-*d* may also determine, at 515, that a DCI format associated with the downlink grant may include a DAI information field. UE 115-*d* may also determine, at 515, that a DAI field is not present in a DCI associated with the downlink grant, and that a number of feedback bits associated with the downlink shared channel transmission is less that a threshold. For example, late feedback information piggybacking may occur if the downlink grants are scheduled by DCI formats that have a DAI field (e.g., a counter DAI or a total DAI). In cases where the downlink grant does not have a DAI field, UE 115-*d* may determine to piggyback a set number of bits of feedback information (e.g., one or two bits).

UE 115-*d* may also determine that the uplink grant at 505 was received prior to the downlink grant at 510, and also that no other downlink grant was received scheduling feedback information to be piggybacked on the uplink shared channel transmission prior to the uplink grant. As such, only feedback information associated with the PDSCH for the downlink grant may be piggybacked, as there is no other PDSCH and associated feedback information to be piggybacked. In some cases, the feedback piggybacking condition may be based on a timing of the uplink grant with respect to the downlink grant. If the conditions are not satisfied, then UE 115-*d* may not expect to receive a downlink grant after the uplink grant, and therefore not receive a corresponding PDSCH on which to generate feedback information for piggybacking. Alternatively, if the conditions are not met, UE 115-*d* may transmit the feedback information in a later PUCCH, as scheduled by base station 105-*d*.

At 520, UE 115-*d* may perform the uplink shared channel transmission based on the determining, where the uplink shared channel transmission includes the feedback information.

Figure 6:
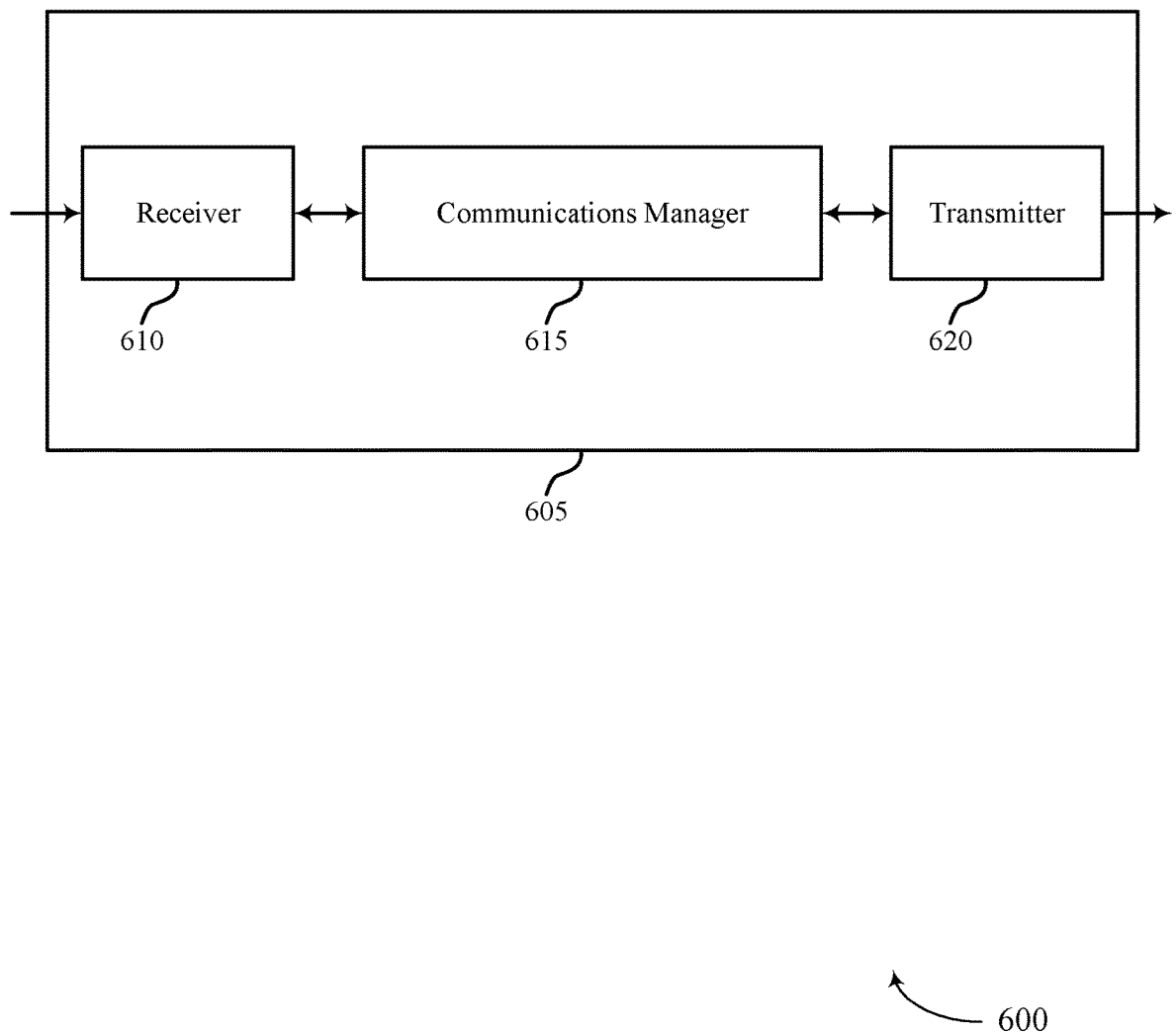
FIGS. 6 and 7 show block diagrams of devices that support uplink shared channel feedback piggybacking in accordance with aspects of the present disclosure.

FIG. 6 shows a block diagram 600 of a device 605 that supports uplink shared channel feedback piggybacking in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to uplink shared channel feedback piggybacking, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive an uplink grant that indicates scheduling information for an uplink shared channel transmission by the UE, the scheduling information including a first set of uplink resources and a second set of uplink resources, determine whether a downlink grant scheduling feedback information to be piggybacked on the uplink shared channel transmission has been received after the uplink grant, select one of the first set of uplink resources or the second set of uplink resources based on the determining, and perform the uplink shared channel transmission using the selected one of the first set of uplink resources or the second set of uplink resources. The communications manager 615 may also receive an uplink grant that indicates scheduling information for an uplink shared channel transmission for the UE, receive, after receiving the uplink grant, a downlink grant scheduling feedback information to be piggybacked on the uplink shared channel transmission, determine based on the downlink grant, that a feedback piggybacking condition is satisfied, and perform the uplink shared channel transmission based on the determining, where the uplink shared channel transmission includes the feedback information. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 described herein may be implemented as a chipset of a wireless modem, and the receiver 610 and the transmitter 620 may be implemented as sets of analog components (e.g., amplifiers, filters, phase shifters, antennas, etc.). The wireless modem may obtain and decode signals from the receiver 610 over a receive interface, and may output signals for transmission to the transmitter 620 over a transmit interface.

The actions performed by the communications manager 615 as described herein may be implemented to realize one or more potential advantages. One implementation may allow a UE 115 to save power and increase battery life by improving the efficiency and reliability of uplink channel transmissions. Further, a UE 115 may also save power and increase battery life by allowing efficient feedback for high priority and low latency messages, which may therefore further improve throughput and reliability at the UE 115.

Figure 7:
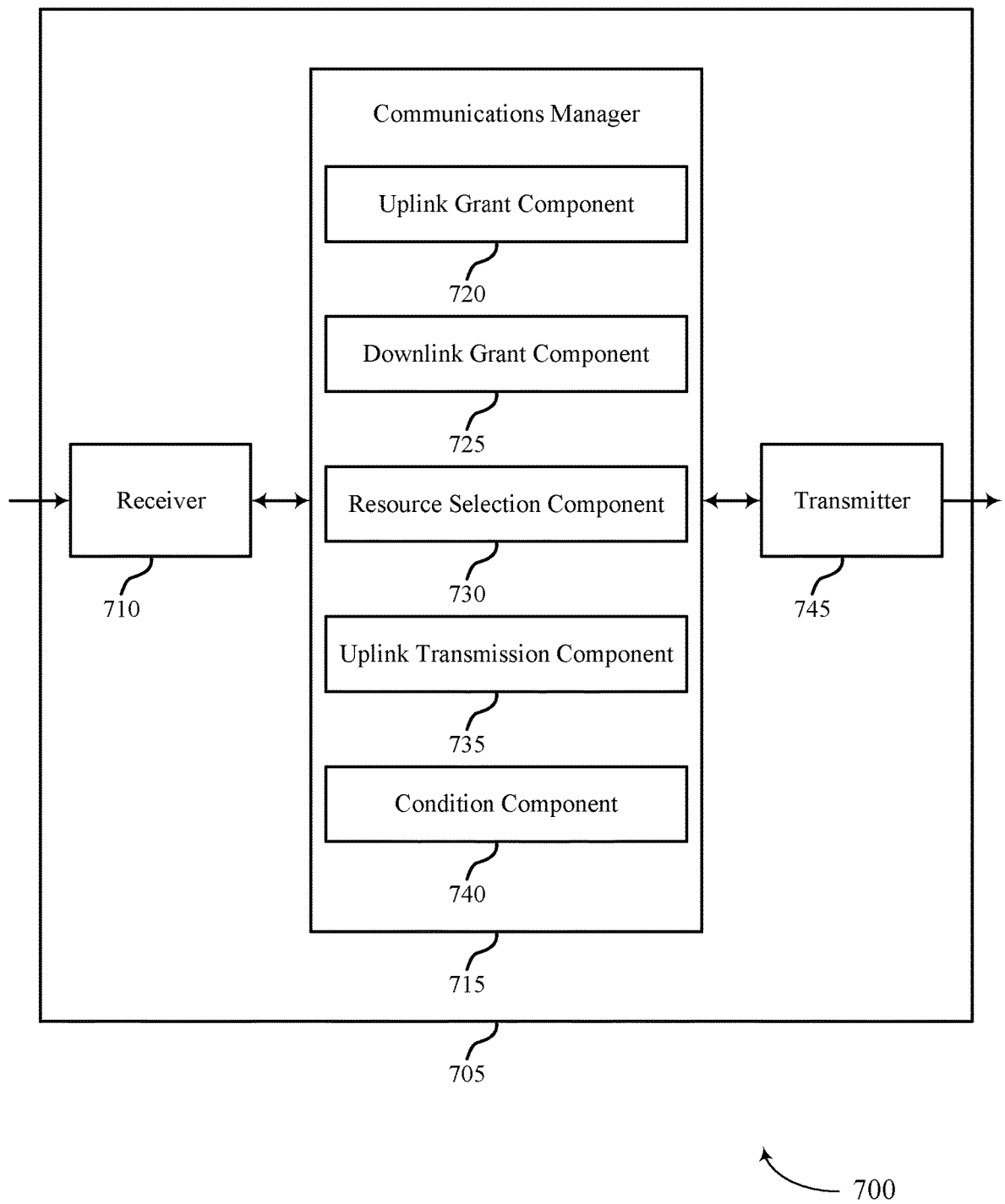

FIG. 7 shows a block diagram 700 of a device 705 that supports uplink shared channel feedback piggybacking in accordance with aspects of the present disclosure. The device 705 may be an example of aspects of a device 605, or a UE 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to uplink shared channel feedback piggybacking, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an uplink grant component 720, a downlink grant component 725, a resource selection component 730, an uplink transmission component 735, and a condition component 740. The communications manager 715 may be an example of aspects of the communications manager 910 described herein.

The uplink grant component 720 may receive an uplink grant that indicates scheduling information for an uplink shared channel transmission by the UE, the scheduling information including a first set of uplink resources and a second set of uplink resources. The downlink grant component 725 may determine whether a downlink grant scheduling feedback information to be piggybacked on the uplink shared channel transmission has been received after the uplink grant. The resource selection component 730 may select one of the first set of uplink resources or the second set of uplink resources based on the determining. The uplink transmission component 735 may perform the uplink shared channel transmission using the selected one of the first set of uplink resources or the second set of uplink resources.

The uplink grant component 720 may receive an uplink grant that indicates scheduling information for an uplink shared channel transmission for the UE. The downlink grant component 725 may receive, after receiving the uplink grant, a downlink grant scheduling feedback information to be piggybacked on the uplink shared channel transmission. The condition component 740 may determine based on the downlink grant, that a feedback piggybacking condition is satisfied. The uplink transmission component 735 may perform the uplink shared channel transmission based on the determining, where the uplink shared channel transmission includes the feedback information.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

A processor of a UE 115 (e.g., controlling the receiver 710, the transmitter 745, or the transceiver 920 as described with reference to FIG. 9) may efficiently operate the components of the UE to save power and increase battery life of the UE 115. For example, the processor of the UE 115 may operate the transmitter 740 to transmit feedback information along with an uplink transmission, in order to improve reliability at the UE 115 and increase efficiency of high-priority messaging. Further, a processor of a UE 115 may efficiently determine when to transmit feedback information, based on resource availability and derivation, and particular transmission conditions. This determination may further improve efficiency of a UE 115.

Figure 8:
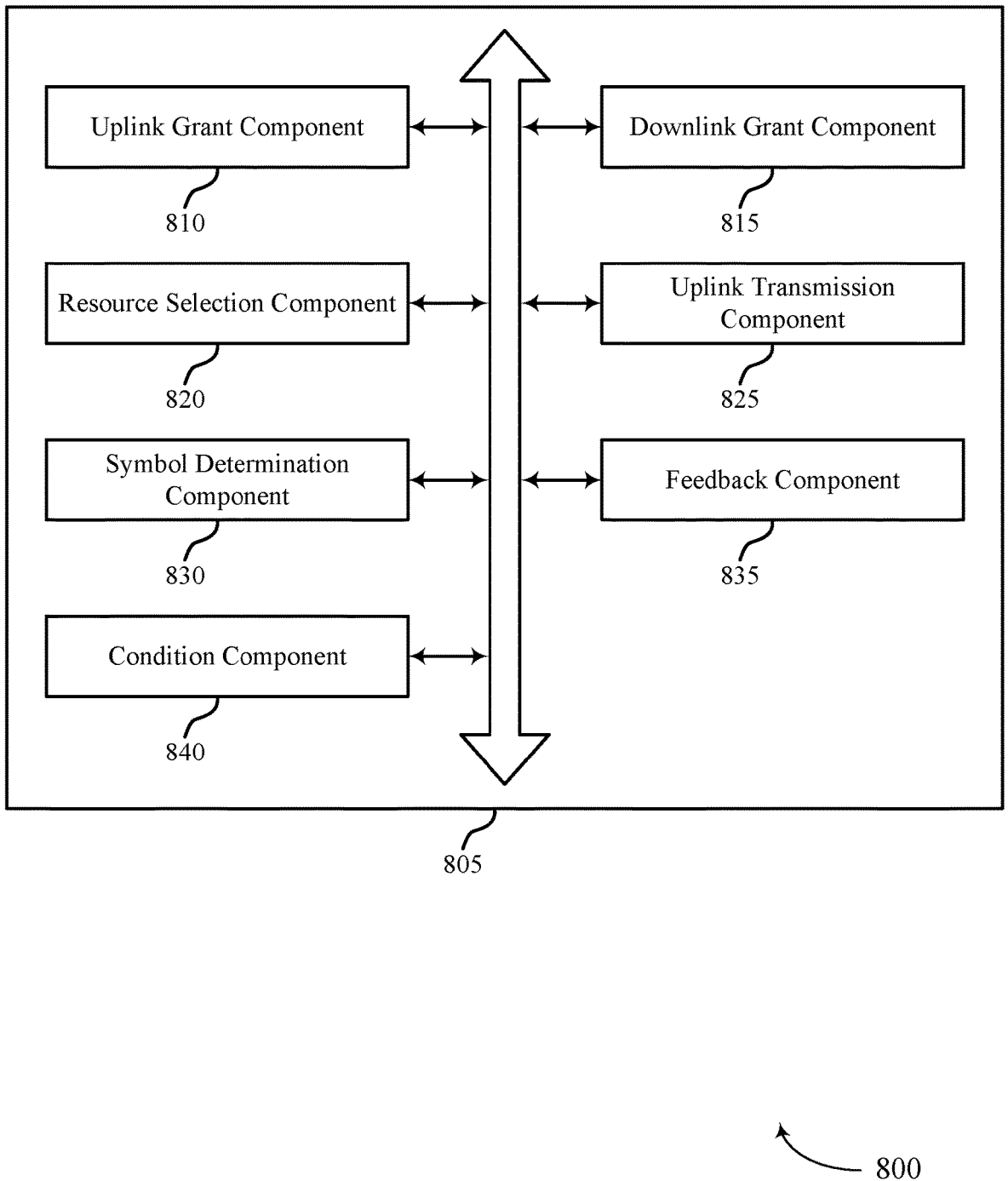
FIG. 8 shows a block diagram of a communications manager that supports uplink shared channel feedback piggybacking in accordance with aspects of the present disclosure.

FIG. 8 shows a block diagram 800 of a communications manager 805 that supports uplink shared channel feedback piggybacking in accordance with aspects of the present disclosure. The communications manager 805 may be an example of aspects of a communications manager 615, a communications manager 715, or a communications manager 910 described herein. The communications manager 805 may include an uplink grant component 810, a downlink grant component 815, a resource selection component 820, an uplink transmission component 825, a symbol determination component 830, a feedback component 835, and a condition component 840. Each of these modules may communicate, directly or indirectly, with one another (e.g., via one or more buses).

The uplink grant component 810 may receive an uplink grant that indicates scheduling information for an uplink shared channel transmission by the UE, the scheduling information including a first set of uplink resources and a second set of uplink resources. In some examples, the uplink grant component 810 may receive an explicit indication of the first set of uplink resources and the second set of uplink resources in the uplink grant. In some examples, the uplink grant component 810 may receive an explicit indication of the first set of uplink resources in the uplink grant.

The downlink grant component 815 may determine whether a downlink grant scheduling feedback information to be piggybacked on the uplink shared channel transmission has been received after the uplink grant.

The resource selection component 820 may select one of the first set of uplink resources or the second set of uplink resources based on the determining. In some examples, the resource selection component 820 may select the second set of uplink resources based on determining that the downlink grant scheduling feedback information to be piggybacked on the uplink shared channel transmission has been received after the uplink grant.

In some examples, the resource selection component 820 may select the first set of uplink resources based on determining that no downlink grant scheduling feedback information to be piggybacked on the uplink shared channel transmission has been received after the uplink grant. In some examples, the resource selection component 820 may determine the second set of uplink resources based on the first set of uplink resources. In some cases, the first set of uplink resources includes a first set of orthogonal frequency division multiplexing symbols and the second set of uplink resources includes a second set of orthogonal frequency division multiplexing symbols. In some cases, a number of resource blocks in the second set of uplink resources is greater than a number of resource blocks in the first set of uplink resources.

The uplink transmission component 825 may perform the uplink shared channel transmission using the selected one of the first set of uplink resources or the second set of uplink resources.

In some examples, the uplink grant component 810 may receive an uplink grant that indicates scheduling information for an uplink shared channel transmission for the UE.

In some examples, the downlink grant component 815 may receive, after receiving the uplink grant, a downlink grant scheduling feedback information to be piggybacked on the uplink shared channel transmission. In some examples, the downlink grant includes one or more of: scheduling information for a downlink shared channel transmission to the UE, an indication of a semi-persistent scheduling downlink shared channel transmission release, an indication of a secondary cell dormancy without scheduling a physical downlink shared channel reception.

In some examples, the uplink transmission component 825 may perform the uplink shared channel transmission based on the determining, where the uplink shared channel transmission includes the feedback information.

The condition component 840 may determine based on the downlink grant, that a feedback piggybacking condition is satisfied. In some examples, the condition component 840 may determine that the feedback information is associated with a priority level for which feedback piggybacking is permitted. In some examples, the condition component 840 may determine that a downlink control information format associated with the downlink grant includes a downlink assignment index information field. In some examples, the condition component 840 may determine that aperiodic channel state information (A-CSI) is absent from the uplink shared channel transmission.

In some examples, the condition component 840 may determine that a downlink assignment index field is not present in a downlink control information format associated with the downlink grant and that a number of feedback bits associated with the downlink shared channel transmission is less than a threshold. In some examples, the condition component 840 may determine that the uplink grant was received prior to the downlink grant and no other downlink grant was received scheduling feedback information to be piggybacked on the uplink shared channel transmission prior to the uplink grant. In some cases, a second high priority communication or a low priority communication. In some cases, the feedback piggybacking condition is based on a timing of the uplink grant with respect to the downlink grant.

The symbol determination component 830 may determine a beginning of the second set of orthogonal frequency division multiplexing symbols based on an end of the first set of orthogonal frequency division multiplexing symbols. In some examples, the symbol determination component 830 may determine a number of the second set of orthogonal frequency division multiplexing symbols based on a number of the first set of orthogonal frequency division multiplexing symbols. The feedback component 835 may determine a number of feedback information bits associated with a number of downlink grants received after the uplink grant. In some examples, the second set of uplink resources is determined based on the number of feedback information bits.

Figure 9:
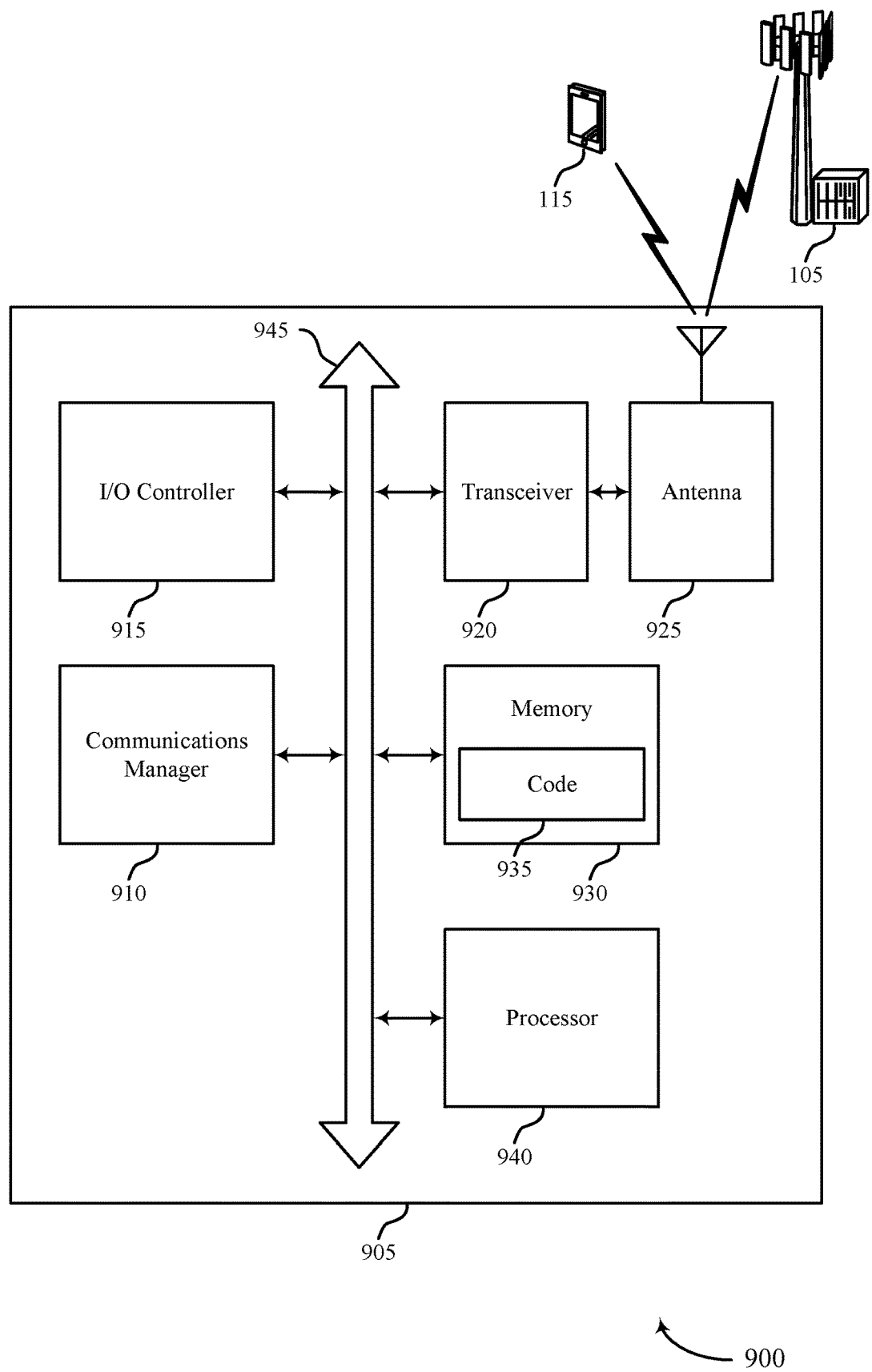
FIG. 9 shows a diagram of a system including a device that supports uplink shared channel feedback piggybacking in accordance with aspects of the present disclosure.

FIG. 9 shows a diagram of a system 900 including a device 905 that supports uplink shared channel feedback piggybacking in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive an uplink grant that indicates scheduling information for an uplink shared channel transmission by the UE, the scheduling information including a first set of uplink resources and a second set of uplink resources, determine whether a downlink grant scheduling feedback information to be piggybacked on the uplink shared channel transmission has been received after the uplink grant, select one of the first set of uplink resources or the second set of uplink resources based on the determining, and perform the uplink shared channel transmission using the selected one of the first set of uplink resources or the second set of uplink resources. The communications manager 910 may also receive an uplink grant that indicates scheduling information for an uplink shared channel transmission for the UE, receive, after receiving the uplink grant, a downlink grant scheduling feedback information to be piggybacked on the uplink shared channel transmission, determine based on the downlink grant, that a feedback piggybacking condition is satisfied, and perform the uplink shared channel transmission based on the determining, where the uplink shared channel transmission includes the feedback information.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may include, for example, a non-transitory computer-readable medium storing computer-readable, computer-executable code 935 including instructions that, when executed, instruct or cause the processor (e.g., a processor of the UE, and thereby causing the UE) to perform various functions described herein, for example, functions associated with aspects described in greater detail in FIGS. 4, 5, 14, 15, 16, and 17. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930 coupled to processor 940) to cause or instruct the device 905 to perform various functions (e.g., functions or tasks supporting uplink shared channel feedback piggybacking).

The code 935 may include instructions to implement aspects of the present disclosure, including instructions to support wireless communications. The code 935 may be stored in a non-transitory computer-readable medium such as memory 930 or other type of memory. In some cases, the code 935 may not be directly executable by the processor 940 but may cause a computer (e.g., when compiled and executed) to perform functions described herein.

Figure 10:
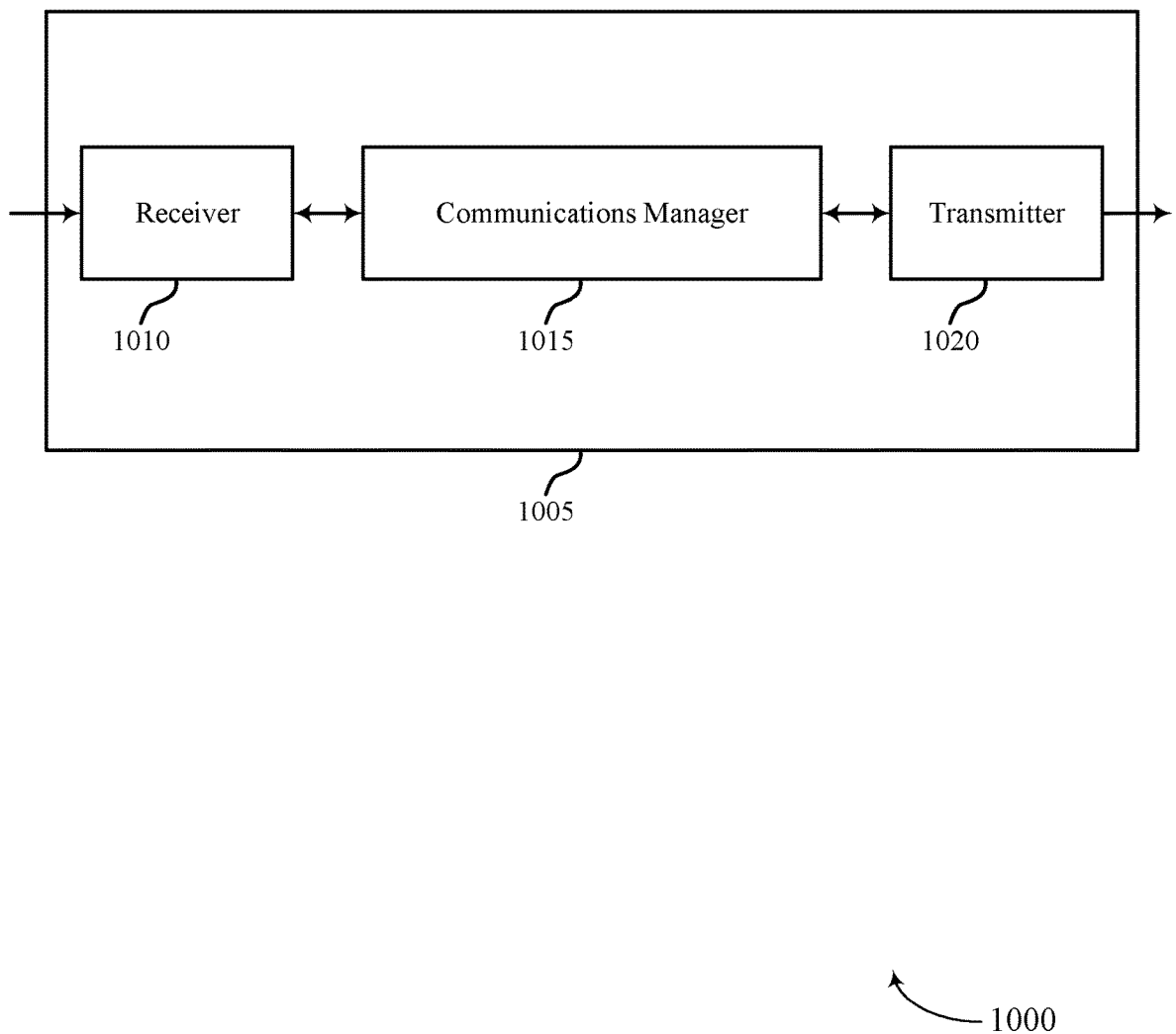
FIGS. 10 and 11 show block diagrams of devices that support uplink shared channel feedback piggybacking in accordance with aspects of the present disclosure.

FIG. 10 shows a block diagram 1000 of a device 1005 that supports uplink shared channel feedback piggybacking in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to uplink shared channel feedback piggybacking, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit an uplink grant that indicates scheduling information for an uplink shared channel transmission by a UE, the scheduling information including a first set of uplink resources and a second set of uplink resources, transmit, after transmitting the uplink grant, a downlink grant scheduling feedback information to be piggybacked on the uplink shared channel transmission, and receive the uplink shared channel transmission, where the uplink shared channel transmission includes feedback information for the downlink shared channel transmission over the second set of uplink resources. The communications manager 1015 may also transmit an uplink grant that indicates scheduling information for an uplink shared channel transmission for a UE, transmit, after transmitting the uplink grant, a downlink grant scheduling feedback information to be piggybacked on the uplink shared channel transmission, and receive the uplink shared channel transmission, where the uplink shared channel transmission includes feedback information for the downlink shared channel transmission based on a feedback piggybacking condition being satisfied. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

The actions performed by the communications manager 1015 as described herein may be implemented to realize one or more potential advantages. One implementation may allow a base station 105 to improve power efficiency by improving the throughput of uplink channel transmissions received by the base station 105. Further, a base station 105 may also improve power efficiency by allowing efficient feedback for high priority and low latency messages, which may therefore also improve reliability at the base station 105.

Figure 11:
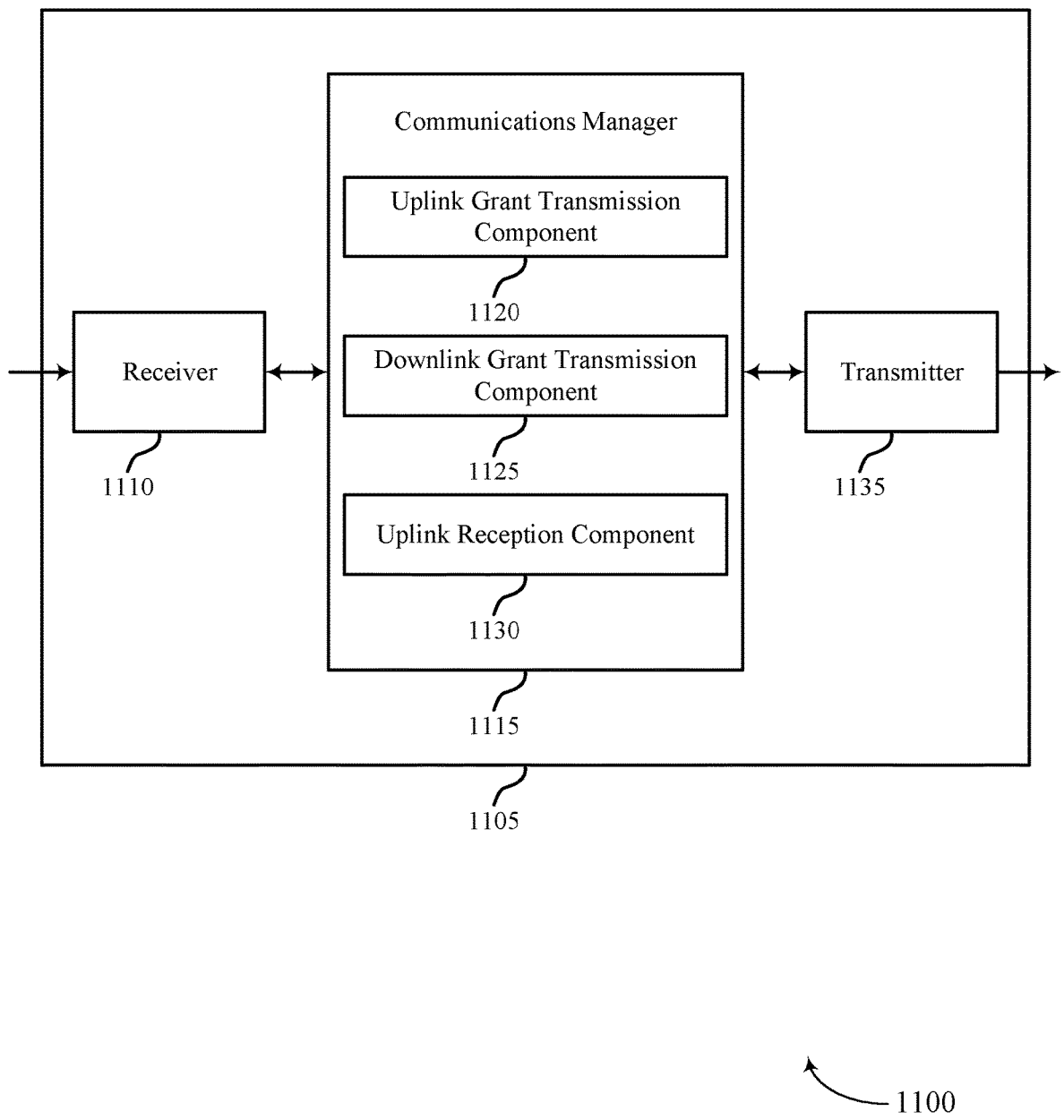

FIG. 11 shows a block diagram 1100 of a device 1105 that supports uplink shared channel feedback piggybacking in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to uplink shared channel feedback piggybacking, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an uplink grant transmission component 1120, a downlink grant transmission component 1125, and an uplink reception component 1130. The communications manager 1115 may be an example of aspects of the communications manager 1310 described herein.

The uplink grant transmission component 1120 may transmit an uplink grant that indicates scheduling information for an uplink shared channel transmission by a UE, the scheduling information including a first set of uplink resources and a second set of uplink resources. The downlink grant transmission component 1125 may transmit, after transmitting the uplink grant, a downlink grant scheduling feedback information to be piggybacked on the uplink shared channel transmission. The uplink reception component 1130 may receive the uplink shared channel transmission, where the uplink shared channel transmission includes feedback information for the downlink shared channel transmission over the second set of uplink resources.

The uplink grant transmission component 1120 may transmit an uplink grant that indicates scheduling information for an uplink shared channel transmission for a UE. The downlink grant transmission component 1125 may transmit, after transmitting the uplink grant, a downlink grant scheduling feedback information to be piggybacked on the uplink shared channel transmission. The uplink reception component 1130 may receive the uplink shared channel transmission, where the uplink shared channel transmission includes feedback information for the downlink shared channel transmission based on a feedback piggybacking condition being satisfied.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
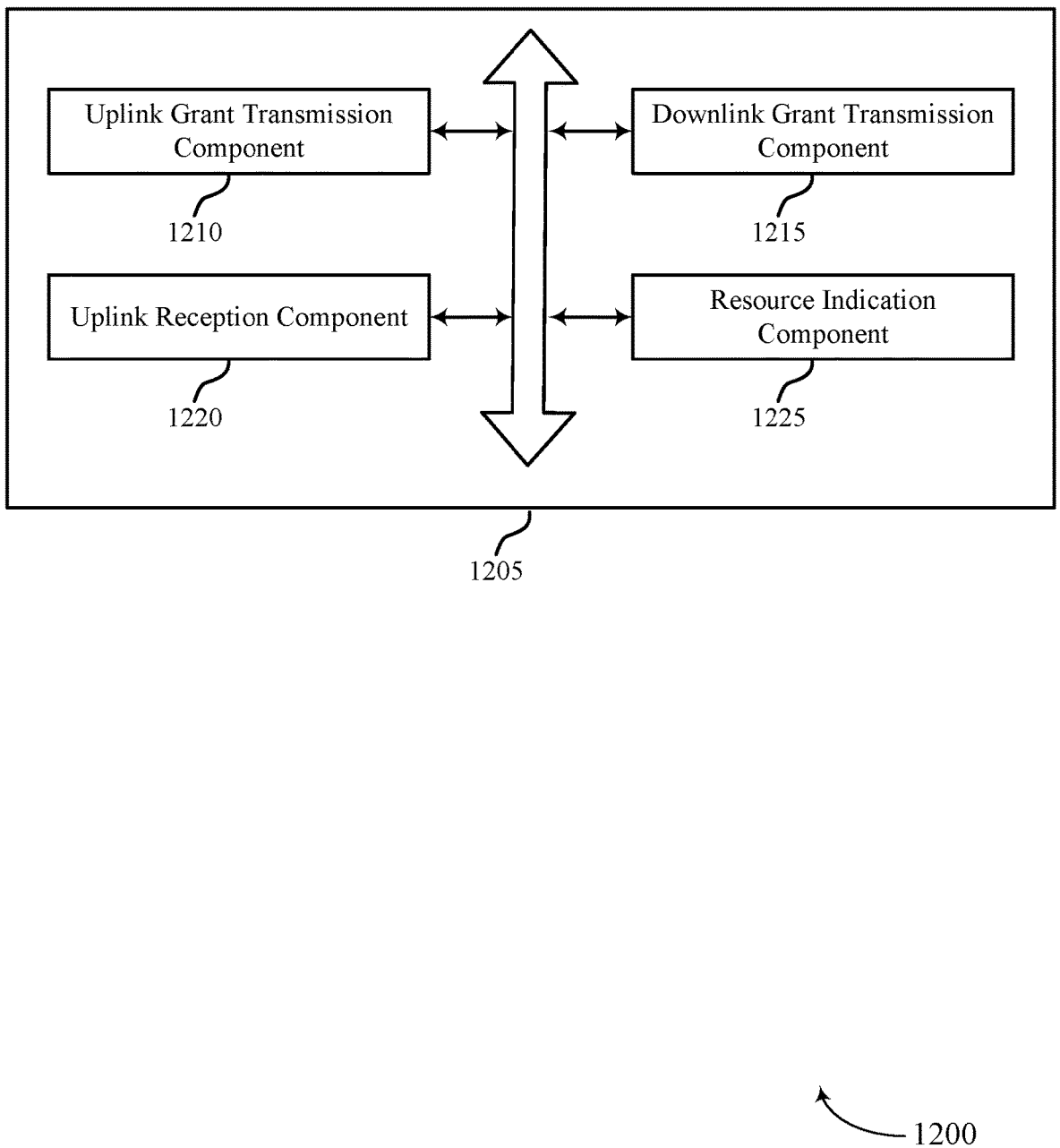
FIG. 12 shows a block diagram of a communications manager that supports uplink shared channel feedback piggybacking in accordance with aspects of the present disclosure.

FIG. 12 shows a block diagram 1200 of a communications manager 1205 that supports uplink shared channel feedback piggybacking in accordance with aspects of the present disclosure. The communications manager 1205 may be an example of aspects of a communications manager 1015, a communications manager 1115, or a communications manager 1310 described herein. The communications manager 1205 may include an uplink grant transmission component 1210, a downlink grant transmission component 1215, an uplink reception component 1220, and a resource indication component 1225. Each of these modules may communicate, directly or indirectly, with one another (e.g., via one or more buses).

The uplink grant transmission component 1210 may transmit an uplink grant that indicates scheduling information for an uplink shared channel transmission by a UE, the scheduling information including a first set of uplink resources and a second set of uplink resources.

The downlink grant transmission component 1215 may transmit, after transmitting the uplink grant, a downlink grant scheduling feedback information to be piggybacked on the uplink shared channel transmission.

The uplink reception component 1220 may receive the uplink shared channel transmission, where the uplink shared channel transmission includes feedback information for the downlink shared channel transmission over the second set of uplink resources.

The resource indication component 1225 may transmit an explicit indication of the first set of uplink resources and the second set of uplink resources in the uplink grant.

In some examples, the resource indication component 1225 may transmit an explicit indication of the first set of uplink resources in the uplink grant; where the second set of uplink resources is implicit from the first set of uplink resources. In some cases, the first set of uplink resources includes a first set of orthogonal frequency division multiplexing symbols and the second set of uplink resources includes a second set of orthogonal frequency division multiplexing symbols.

In some examples, the uplink grant transmission component 1210 may transmit an uplink grant that indicates scheduling information for an uplink shared channel transmission for a UE.

In some examples, the downlink grant transmission component 1215 may transmit, after transmitting the uplink grant, a downlink grant scheduling feedback information to be piggybacked on the uplink shared channel transmission. In some examples, the downlink grant includes one or more of: scheduling information for a downlink shared channel transmission to the UE, an indication of a semi-persistent scheduling downlink shared channel transmission release, an indication of a secondary cell dormancy without scheduling a physical downlink shared channel reception.

In some examples, the uplink reception component 1220 may receive the uplink shared channel transmission, where the uplink shared channel transmission includes feedback information for the downlink shared channel transmission based on a feedback piggybacking condition being satisfied.

In some cases, the feedback piggybacking condition is based on a priority level of the feedback information. In some cases, a second high priority communication or a low priority communication. In some cases, the feedback piggybacking condition is based on a downlink control information format associated with the downlink grant. In some cases, the feedback piggybacking condition is based on a presence or absence of a downlink assignment index field in a downlink control information format associated with the downlink grant and a number of feedback bits associated with the downlink shared channel transmission. In some cases, the feedback piggybacking condition is based on an absence of A-CSI information in the uplink shared channel transmission.

Figure 13:
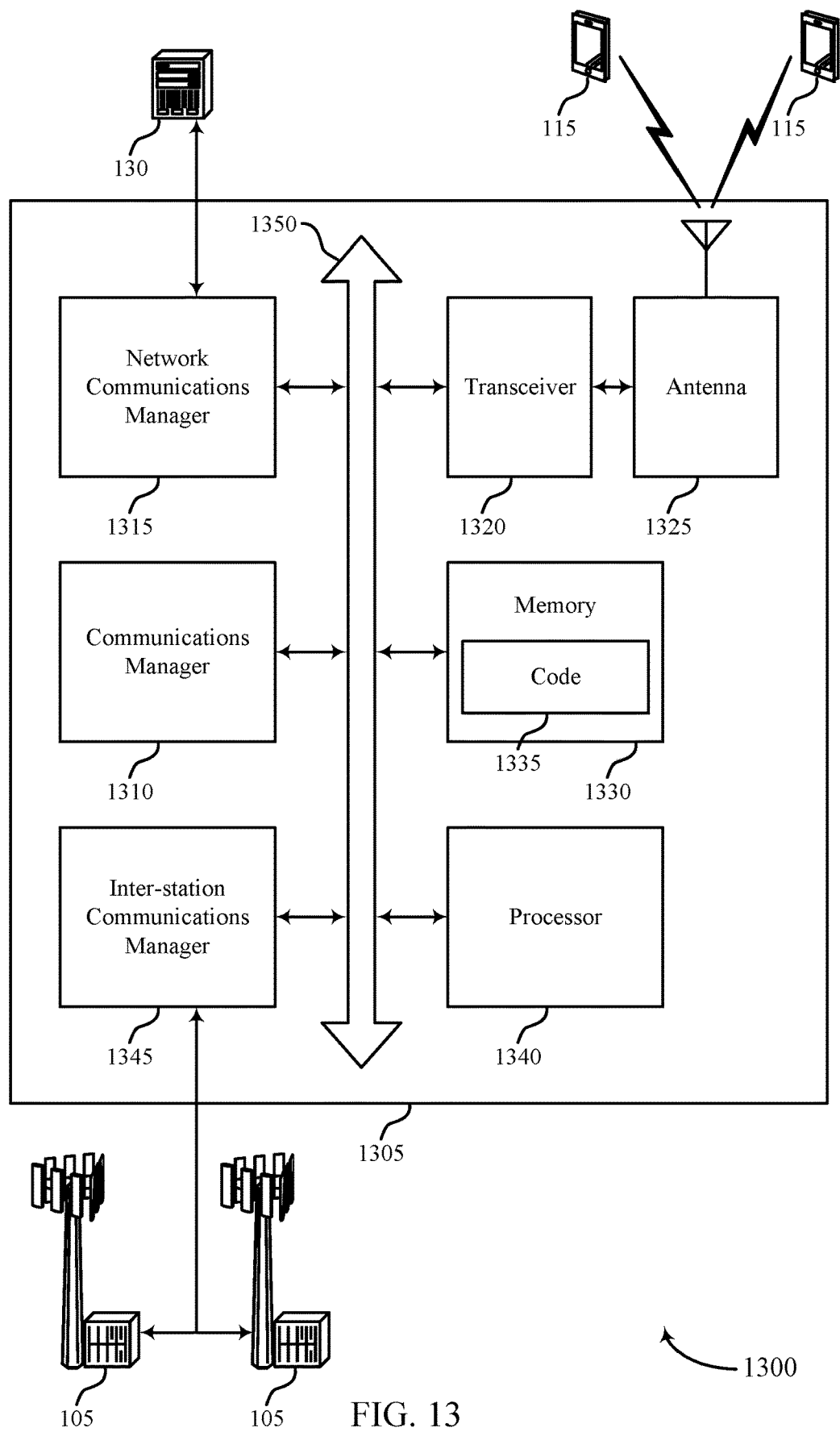
FIG. 13 shows a diagram of a system including a device that supports uplink shared channel feedback piggybacking in accordance with aspects of the present disclosure.

FIG. 13 shows a diagram of a system 1300 including a device 1305 that supports uplink shared channel feedback piggybacking in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit an uplink grant that indicates scheduling information for an uplink shared channel transmission by a UE, the scheduling information including a first set of uplink resources and a second set of uplink resources, transmit, after transmitting the uplink grant, a downlink grant scheduling feedback information to be piggybacked on the uplink shared channel transmission, and receive the uplink shared channel transmission, where the uplink shared channel transmission includes feedback information for the downlink shared channel transmission over the second set of uplink resources. The communications manager 1310 may also transmit an uplink grant that indicates scheduling information for an uplink shared channel transmission for a UE, transmit, after transmitting the uplink grant, a downlink grant scheduling feedback information to be piggybacked on the uplink shared channel transmission, and receive the uplink shared channel transmission, where the uplink shared channel transmission includes feedback information for the downlink shared channel transmission based on a feedback piggybacking condition being satisfied.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may include, for example, a non-transitory computer-readable medium storing computer-readable code 1335 including instructions that, when executed, instruct or cause the processor (e.g., the processor 1340 of the base station, and thereby causing the base station) to perform various functions described herein, for example, functions associated with aspects described in greater detail in FIGS. 4, 5, 14, 15, 16, and 17. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330 coupled to processor 1340) to cause or instruct the device 1305 to perform various functions (e.g., functions or tasks supporting uplink shared channel feedback piggybacking).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as memory 1330 or other type of memory. In some cases, the code 1335 may not be directly executable by the processor 1340 but may cause a computer (e.g., when compiled and executed) to perform functions described herein.

Figure 14:
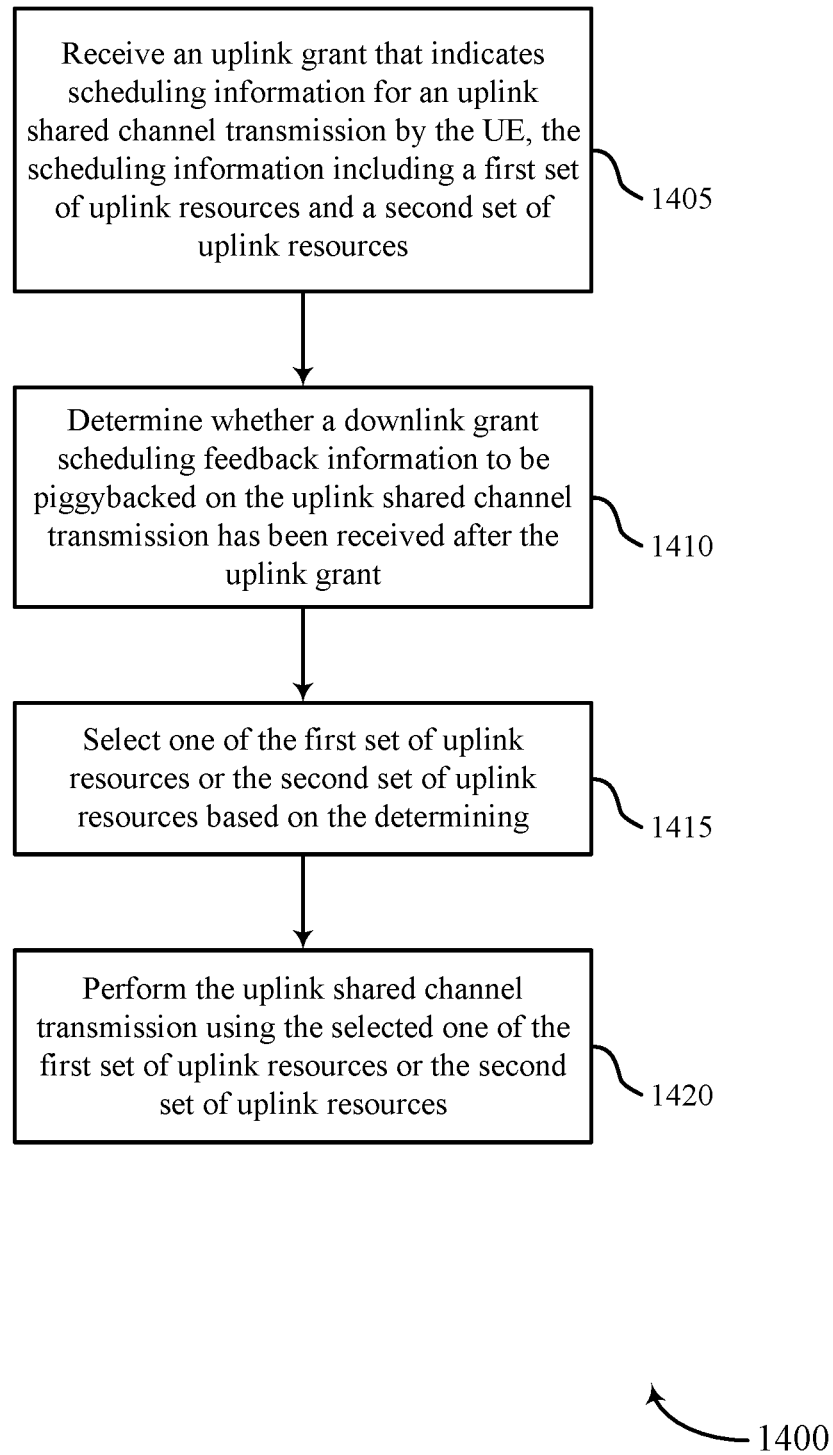
FIGS. 14 through 17 show flowcharts illustrating methods that support uplink shared channel feedback piggybacking in accordance with aspects of the present disclosure.

FIG. 14 shows a flowchart illustrating a method 1400 that supports uplink shared channel feedback piggybacking in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may receive an uplink grant that indicates scheduling information for an uplink shared channel transmission by the UE, the scheduling information including a first set of uplink resources and a second set of uplink resources. The operations of 1405 may be performed according to the methods described herein. In some examples, aspects of the operations of 1405 may be performed by an uplink grant component as described with reference to FIGS. 6 through 9.

At 1410, the UE may determine whether a downlink grant scheduling feedback information to be piggybacked on the uplink shared channel transmission has been received after the uplink grant. The operations of 1410 may be performed according to the methods described herein. In some examples, aspects of the operations of 1410 may be performed by a downlink grant component as described with reference to FIGS. 6 through 9.

At 1415, the UE may select one of the first set of uplink resources or the second set of uplink resources based on the determining. The operations of 1415 may be performed according to the methods described herein. In some examples, aspects of the operations of 1415 may be performed by a resource selection component as described with reference to FIGS. 6 through 9.

At 1420, the UE may perform the uplink shared channel transmission using the selected one of the first set of uplink resources or the second set of uplink resources. The operations of 1420 may be performed according to the methods described herein. In some examples, aspects of the operations of 1420 may be performed by an uplink transmission component as described with reference to FIGS. 6 through 9.

Additionally or alternatively, means for performing 1400 may, but not necessarily, include, for example, antenna 925, transceiver 920, communications manager 910, memory 930 (including code 935), processor 940, and or bus 945.

Figure 15:
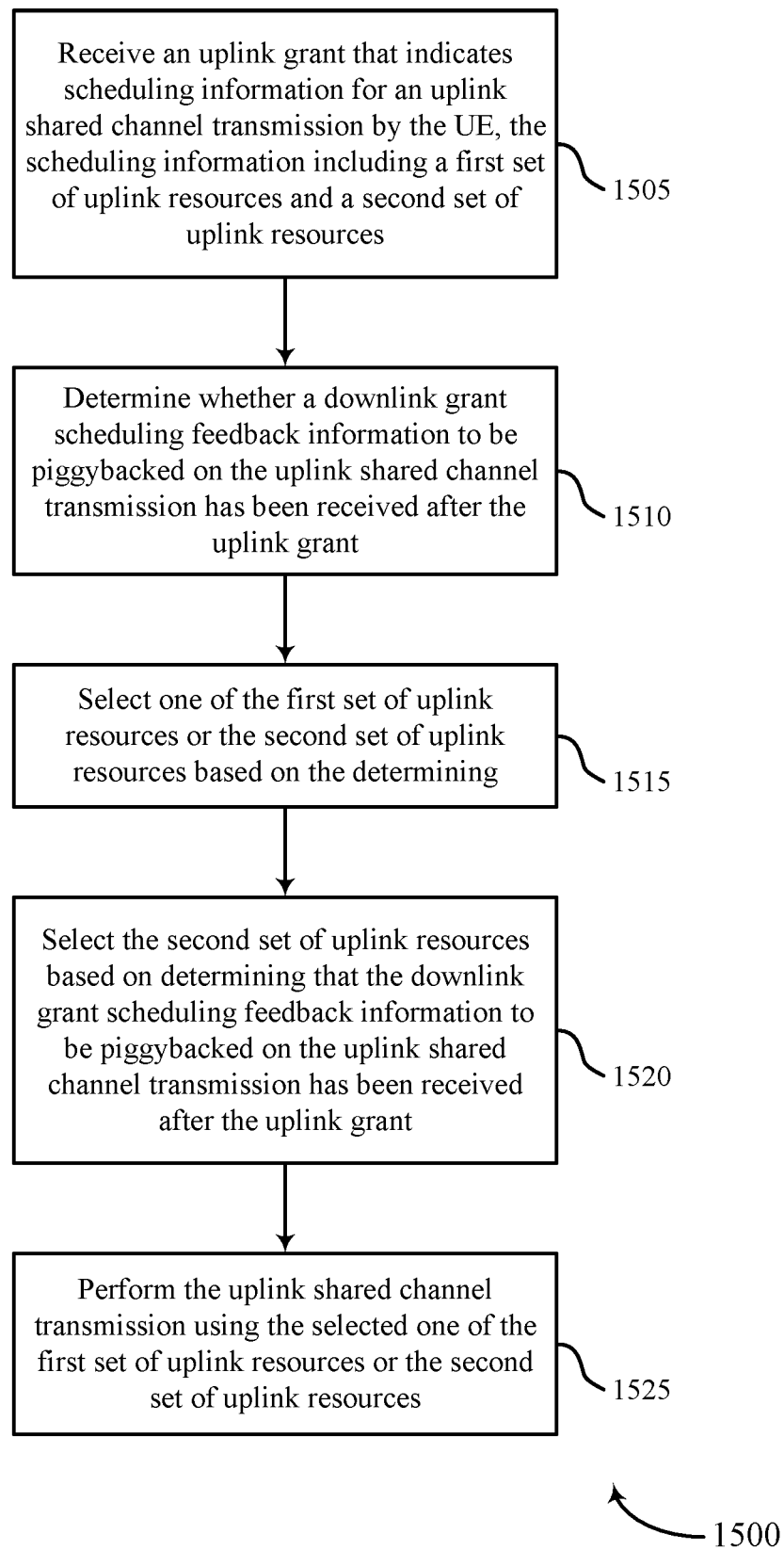

FIG. 15 shows a flowchart illustrating a method 1500 that supports uplink shared channel feedback piggybacking in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may receive an uplink grant that indicates scheduling information for an uplink shared channel transmission by the UE, the scheduling information including a first set of uplink resources and a second set of uplink resources. The operations of 1505 may be performed according to the methods described herein. In some examples, aspects of the operations of 1505 may be performed by an uplink grant component as described with reference to FIGS. 6 through 9.

At 1510, the UE may determine whether a downlink grant scheduling feedback information to be piggybacked on the uplink shared channel transmission has been received after the uplink grant. The operations of 1510 may be performed according to the methods described herein. In some examples, aspects of the operations of 1510 may be performed by a downlink grant component as described with reference to FIGS. 6 through 9.

At 1515, the UE may select one of the first set of uplink resources or the second set of uplink resources based on the determining. The operations of 1515 may be performed according to the methods described herein. In some examples, aspects of the operations of 1515 may be performed by a resource selection component as described with reference to FIGS. 6 through 9.

At 1520, the UE may select the second set of uplink resources based on determining that the downlink grant scheduling feedback information to be piggybacked on the uplink shared channel transmission has been received after the uplink grant. The operations of 1520 may be performed according to the methods described herein. In some examples, aspects of the operations of 1520 may be performed by a resource selection component as described with reference to FIGS. 6 through 9.

At 1525, the UE may perform the uplink shared channel transmission using the selected one of the first set of uplink resources or the second set of uplink resources. The operations of 1525 may be performed according to the methods described herein. In some examples, aspects of the operations of 1525 may be performed by an uplink transmission component as described with reference to FIGS. 6 through 9.

Additionally or alternatively, means for performing 1500 may, but not necessarily, include, for example, antenna 925, transceiver 920, communications manager 910, memory 930 (including code 935), processor 940, and or bus 945.

Figure 16:
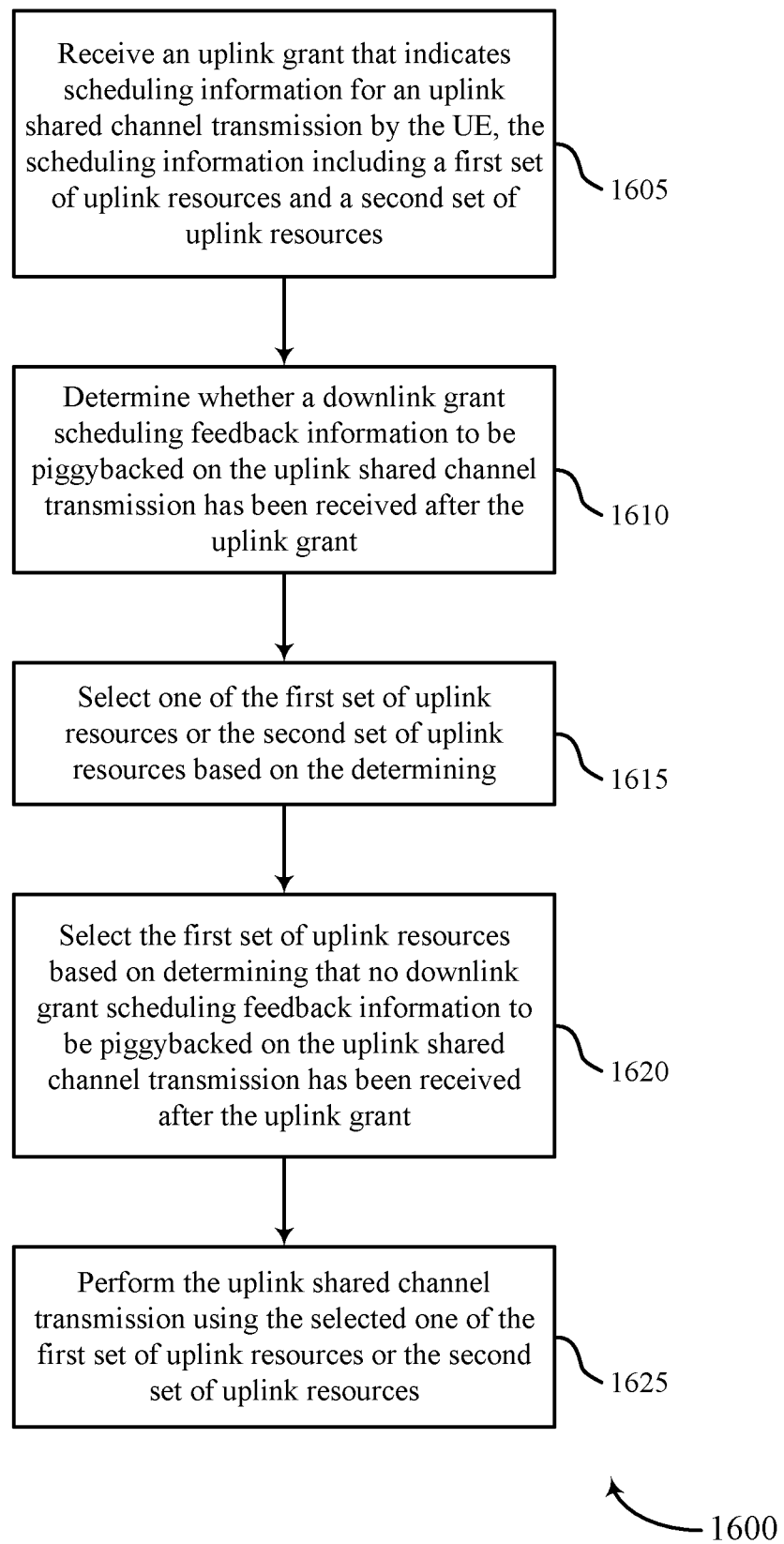

FIG. 16 shows a flowchart illustrating a method 1600 that supports uplink shared channel feedback piggybacking in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may receive an uplink grant that indicates scheduling information for an uplink shared channel transmission by the UE, the scheduling information including a first set of uplink resources and a second set of uplink resources. The operations of 1605 may be performed according to the methods described herein. In some examples, aspects of the operations of 1605 may be performed by an uplink grant component as described with reference to FIGS. 6 through 9.

At 1610, the UE may determine whether a downlink grant scheduling feedback information to be piggybacked on the uplink shared channel transmission has been received after the uplink grant. The operations of 1610 may be performed according to the methods described herein. In some examples, aspects of the operations of 1610 may be performed by a downlink grant component as described with reference to FIGS. 6 through 9.

At 1615, the UE may select one of the first set of uplink resources or the second set of uplink resources based on the determining. The operations of 1615 may be performed according to the methods described herein. In some examples, aspects of the operations of 1615 may be performed by a resource selection component as described with reference to FIGS. 6 through 9.

At 1620, the UE may select the first set of uplink resources based on determining that no downlink grant scheduling feedback information to be piggybacked on the uplink shared channel transmission has been received after the uplink grant. The operations of 1620 may be performed according to the methods described herein. In some examples, aspects of the operations of 1620 may be performed by a resource selection component as described with reference to FIGS. 6 through 9.

At 1625, the UE may perform the uplink shared channel transmission using the selected one of the first set of uplink resources or the second set of uplink resources. The operations of 1625 may be performed according to the methods described herein. In some examples, aspects of the operations of 1625 may be performed by an uplink transmission component as described with reference to FIGS. 6 through 9.

Additionally or alternatively, means for performing 1600 may, but not necessarily, include, for example, antenna 925, transceiver 920, communications manager 910, memory 930 (including code 935), processor 940, and or bus 945.

Figure 17:
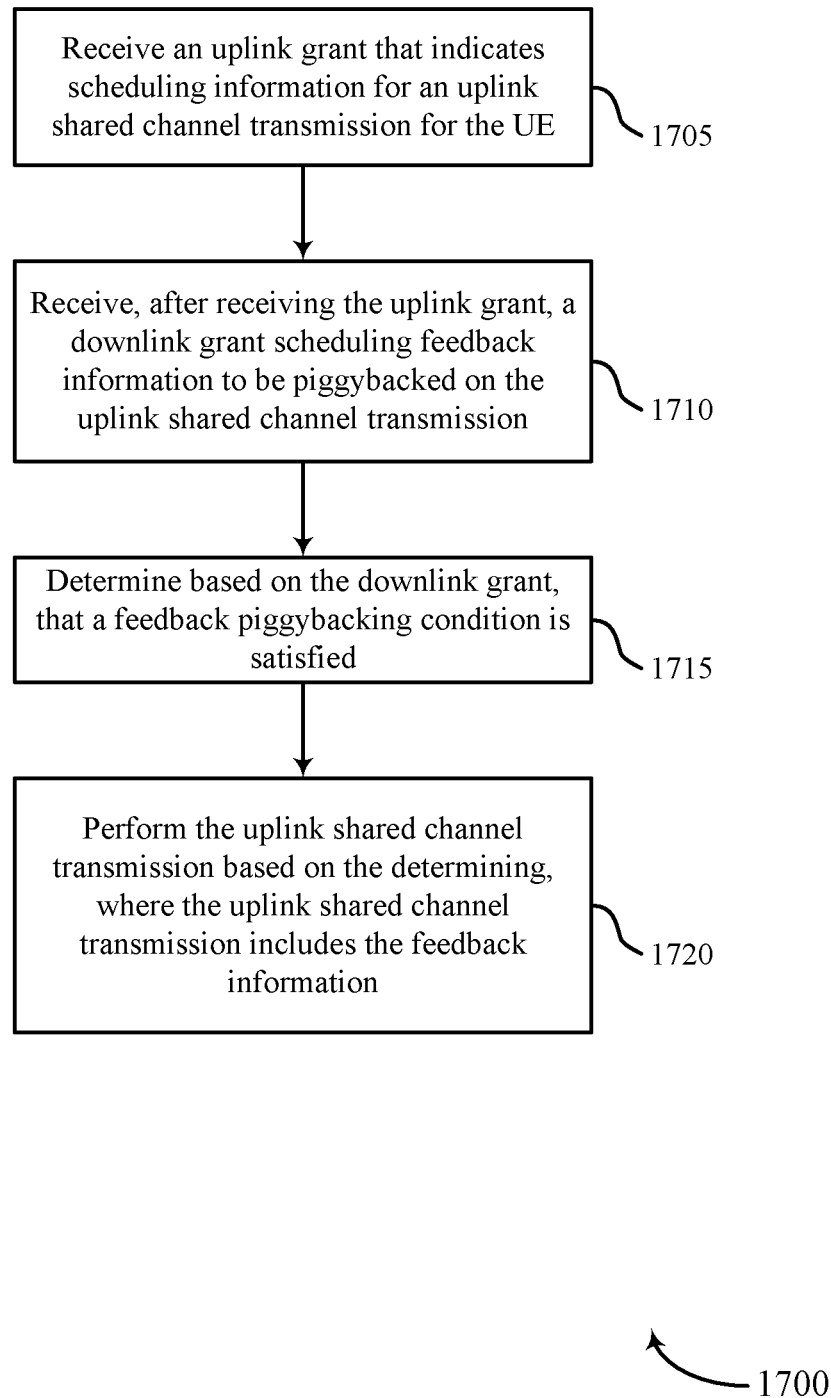

FIG. 17 shows a flowchart illustrating a method 1700 that supports uplink shared channel feedback piggybacking in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1705, the UE may receive an uplink grant that indicates scheduling information for an uplink shared channel transmission for the UE. The operations of 1705 may be performed according to the methods described herein. In some examples, aspects of the operations of 1705 may be performed by an uplink grant component as described with reference to FIGS. 6 through 9.

At 1710, the UE may receive, after receiving the uplink grant, a downlink grant scheduling feedback information to be piggybacked on the uplink shared channel transmission. The operations of 1710 may be performed according to the methods described herein. In some examples, aspects of the operations of 1710 may be performed by a downlink grant component as described with reference to FIGS. 6 through 9.

At 1715, the UE may determine based on the downlink grant, that a feedback piggybacking condition is satisfied. The operations of 1715 may be performed according to the methods described herein. In some examples, aspects of the operations of 1715 may be performed by a condition component as described with reference to FIGS. 6 through 9.

At 1720, the UE may perform the uplink shared channel transmission based on the determining, where the uplink shared channel transmission includes the feedback information. The operations of 1720 may be performed according to the methods described herein. In some examples, aspects of the operations of 1720 may be performed by an uplink transmission component as described with reference to FIGS. 6 through 9.

Additionally or alternatively, means for performing 1700 may, but not necessarily, include, for example, antenna 925, transceiver 920, communications manager 910, memory 930 (including code 935), processor 940, and or bus 945.

The following provides an overview of aspects of the present disclosure:

Aspect 1: A method for wireless communications at a UE, comprising: receiving an uplink grant that indicates scheduling information for an uplink shared channel transmission for the UE; receiving, after receiving the uplink grant, a downlink grant scheduling feedback information to be piggybacked on the uplink shared channel transmission; determining based at least in part on the downlink grant, that a feedback piggybacking condition is satisfied; and performing the uplink shared channel transmission based at least in part on the determining, wherein the uplink shared channel transmission includes the feedback information.

Aspect 2: The method of aspect 1, wherein determining that the feedback piggybacking condition is satisfied comprises: determining that the feedback information is associated with a priority level for which feedback piggybacking is permitted.

Aspect 3: The method of aspect 2, wherein the feedback information comprises a first high priority communication and the uplink shared channel transmission comprises one or more of: a second high priority communication or a low priority communication.

Aspect 4: The method of any of aspects 1 through 3, wherein determining that the feedback piggybacking condition is satisfied comprises: determining that a downlink control information format associated with the downlink grant includes a downlink assignment index information field.

Aspect 5: The method of any of aspects 1 through 4, wherein determining that the feedback piggybacking condition is satisfied comprises: determining that a downlink assignment index field is not present in a downlink control information format associated with the downlink grant and that a number of feedback bits associated with the feedback information is less than a threshold.

Aspect 6: The method of any of aspects 1 through 5, wherein determining that the feedback piggybacking condition is satisfied comprises: determining that the uplink grant was received prior to the downlink grant and no other downlink grant was received scheduling feedback information to be piggybacked on the uplink shared channel transmission prior to the uplink grant.

Aspect 7: The method of any of aspects 1 through 6, wherein the feedback piggybacking condition is based at least in part on a timing of the uplink grant with respect to the downlink grant.

Aspect 8: The method of any of aspects 1 through 7, wherein the downlink grant comprises one or more of: scheduling information for a downlink shared channel transmission to the UE, an indication of a semi-persistent scheduling downlink shared channel transmission release, an indication of a secondary cell dormancy without scheduling a physical downlink shared channel reception.

Aspect 9: The method of any of aspects 1 through 8, wherein determining that the feedback piggybacking condition is satisfied comprises: determining that aperiodic channel state information is absent from the uplink shared channel transmission.

Aspect 10: A method for wireless communications at a base station, comprising: transmitting an uplink grant that indicates scheduling information for an uplink shared channel transmission for a UE; transmitting, after transmitting the uplink grant, a downlink grant scheduling feedback information to be piggybacked on the uplink shared channel transmission; and receiving the uplink shared channel transmission, wherein the uplink shared channel transmission includes feedback information for a downlink shared channel transmission based at least in part on a feedback piggybacking condition being satisfied.

Aspect 11: The method of aspect 10, wherein the feedback piggybacking condition is based on a priority level of the feedback information.

Aspect 12: The method of aspect 11, wherein the feedback information comprises a first high priority communication and the uplink shared channel transmission comprises one or more of: a second high priority communication or a low priority communication.

Aspect 13: The method of any of aspects 10 through 12, wherein the feedback piggybacking condition is based at least in part on a downlink control information format associated with the downlink grant.

Aspect 14: The method of any of aspects 10 through 13, wherein the feedback piggybacking condition is based at least in part on a presence or absence of a downlink assignment index field in a downlink control information format associated with the downlink grant and a number of feedback bits associated with the downlink shared channel transmission.

Aspect 15: The method of any of aspects 10 through 14, wherein the downlink grant comprises one or more of: scheduling information for a downlink shared channel transmission to the UE, an indication of a semi-persistent scheduling downlink shared channel transmission release, an indication of a secondary cell dormancy without scheduling a physical downlink shared channel reception.

Aspect 16: The method of any of aspects 10 through 15, wherein the feedback piggybacking condition is based at least in part on an absence of aperiodic channel state information in the uplink shared channel transmission.

Aspect 17: An apparatus for wireless communications at a UE, comprising a processor; memory coupled with the processor; and instructions stored in the memory and executable by the processor to cause the apparatus to perform a method of any of aspects 1 through 9.

Aspect 18: An apparatus for wireless communications at a UE, comprising at least one means for performing a method of any of aspects 1 through 9.

Aspect 19: A non-transitory computer-readable medium storing code for wireless communications at a UE, the code comprising instructions executable by a processor to perform a method of any of aspects 1 through 9.

Aspect 20: An apparatus for wireless communications at a base station, comprising a processor; memory coupled with the processor; and instructions stored in the memory and executable by the processor to cause the apparatus to perform a method of any of aspects 10 through 16.

Aspect 21: An apparatus for wireless communications at a base station, comprising at least one means for performing a method of any of aspects 10 through 16.

Aspect 22: A non-transitory computer-readable medium storing code for wireless communications at a base station, the code comprising instructions executable by a processor to perform a method of any of aspects 10 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
receiving an uplink grant that indicates scheduling information for an uplink shared channel transmission for the UE;
receiving, after receiving the uplink grant, a downlink grant indicating resources for an upcoming downlink transmission and scheduling feedback information associated with the upcoming downlink transmission; and
performing the uplink shared channel transmission including the feedback information based at least in part on the downlink grant and on satisfying a feedback piggybacking condition associated with transmitting the feedback information on resources scheduled for the uplink shared channel transmission, wherein the feedback piggybacking condition is satisfied based on an absence of an additional downlink grant scheduling feedback information to be piggybacked on the uplink shared channel transmission prior to the uplink grant.

2. The method of claim 1, further comprising:
determining that the feedback piggybacking condition is satisfied when the feedback information is associated with a priority level for which feedback piggybacking is permitted.

3. The method of claim 2, wherein the feedback information comprises a first high priority communication and the uplink shared channel transmission comprises one or more of: a second high priority communication or a low priority communication.

4. The method of claim 1, further comprising:
determining that the feedback piggybacking condition is satisfied when a downlink control information format associated with the downlink grant includes a downlink assignment index information field.

5. The method of claim 1, further comprising:
determining that the feedback piggybacking condition is satisfied when a downlink assignment index field is not present in a downlink control information format associated with the downlink grant and a number of feedback bits associated with the feedback information is less than a threshold.

6. The method of claim 1, wherein the feedback piggybacking condition is based at least in part on a timing of the uplink grant with respect to the downlink grant.

7. The method of claim 1, wherein the downlink grant comprises one or more of: scheduling information for a downlink shared channel transmission to the UE, an indication of a semi-persistent scheduling downlink shared channel transmission release, an indication of a secondary cell dormancy without scheduling a physical downlink shared channel reception.

8. The method of claim 1, further comprising:
determining that the feedback piggybacking condition is satisfied when aperiodic channel state information is absent from the uplink shared channel transmission.

9. A method for wireless communications at a network device, comprising:
transmitting an uplink grant that indicates scheduling information for an uplink shared channel transmission for a user equipment (UE);
transmitting, after transmitting the uplink grant, a downlink grant indicating resources for an upcoming downlink transmission and scheduling feedback information associated with the upcoming downlink transmission; and
receiving the uplink shared channel transmission including the feedback information based at least in part on satisfying a feedback piggybacking condition, wherein the feedback piggybacking condition is associated with transmitting the feedback information on resources scheduled for the uplink shared channel transmission and the feedback piggybacking condition is satisfied based on an absence of an additional downlink grant scheduling feedback information to be piggybacked on the uplink shared channel transmission prior to the uplink grant.

10. The method of claim 9, wherein the feedback piggybacking condition is based on a priority level of the feedback information.

11. The method of claim 10, wherein the feedback information comprises a first high priority communication and the uplink shared channel transmission comprises one or more of: a second high priority communication or a low priority communication.

12. The method of claim 9, wherein the feedback piggybacking condition is based at least in part on a downlink control information format associated with the downlink grant.

13. The method of claim 9, wherein the feedback piggybacking condition is based at least in part on a presence or absence of a downlink assignment index field in a downlink control information format associated with the downlink grant and a number of feedback bits associated with the uplink shared channel transmission.

14. The method of claim 9, wherein the downlink grant comprises one or more of: scheduling information for a downlink shared channel transmission to the UE, an indication of a semi-persistent scheduling downlink shared channel transmission release, an indication of a secondary cell dormancy without scheduling a physical downlink shared channel reception.

15. The method of claim 9, wherein the feedback piggybacking condition is based at least in part on an absence of aperiodic channel state information in the uplink shared channel transmission.

16. An apparatus for wireless communications at a user equipment (UE), comprising:
a processor,
memory coupled with the processor; and
instructions stored in the memory and executable by the processor to cause the apparatus to:
receive an uplink grant that indicates scheduling information for an uplink shared channel transmission for the UE;
receive, after receiving the uplink grant, a downlink grant indicating resources for an upcoming downlink transmission and scheduling feedback information associated with the upcoming downlink transmission; and
perform the uplink shared channel transmission including the feedback information based at least in part on the downlink grant and on satisfying a feedback piggybacking condition associated with transmitting the feedback information on resources scheduled for the uplink shared channel transmission, wherein the feedback piggybacking condition is satisfied based on an absence of an additional downlink grant scheduling feedback information to be piggybacked on the uplink shared channel transmission prior to the uplink grant.

17. The apparatus of claim 16, wherein the instructions to are further executable by the processor to cause the apparatus to:
determine that the feedback piggybacking condition is satisfied when the feedback information is associated with a priority level for which feedback piggybacking is permitted.

18. The apparatus of claim 17, wherein the feedback information comprises a first high priority communication and the uplink shared channel transmission comprises one or more of: comprises a second high priority communication or a low priority communication.

19. The apparatus of claim 16, wherein the instructions are further executable by the processor to cause the apparatus to:
determine that the feedback piggybacking condition is satisfied when a downlink control information format associated with the downlink grant includes a downlink assignment index information field.

20. The apparatus of claim 16, wherein the instructions to are further executable by the processor to cause the apparatus to:
determine that the feedback piggybacking condition is satisfied when a downlink assignment index field is not present in a downlink control information format associated with the downlink grant and a number of feedback bits associated with the feedback information is less than a threshold.

21. The apparatus of claim 16, wherein the feedback piggybacking condition is based at least in part on a timing of the uplink grant with respect to the downlink grant.

22. The apparatus of claim 16, wherein the downlink grant comprises one or more of: scheduling information for a downlink shared channel transmission to the UE, an indication of a semi-persistent scheduling downlink shared channel transmission release, an indication of a secondary cell dormancy without scheduling a physical downlink shared channel reception.

23. An apparatus for wireless communications at a network device, comprising:
a processor;
memory coupled with the processor; and
instructions stored in the memory and executable by the processor to cause the apparatus to:
transmit an uplink grant that indicates scheduling information for an uplink shared channel transmission for a user equipment (UE);
transmit, after transmitting the uplink grant, a downlink grant indicating resources for an upcoming downlink transmission and scheduling feedback information associated with the upcoming downlink transmission; and
receive the uplink shared channel transmission including the feedback information based at least in part on satisfying a feedback piggybacking condition associated with transmitting the feedback information on resources scheduled for the uplink shared channel transmission, wherein the feedback piggybacking condition is satisfied based on an absence of an additional downlink grant scheduling feedback information to be piggybacked on the uplink shared channel transmission prior to the uplink grant.

24. The apparatus of claim 23, wherein the feedback piggybacking condition is based on a priority level of the feedback information.

25. The apparatus of claim 24, wherein the feedback information comprises a first high priority communication and the uplink shared channel transmission comprises one or more of: comprises a second high priority communication or a low priority communication.

26. The apparatus of claim 23, wherein the feedback piggybacking condition is based at least in part on a downlink control information format associated with the downlink grant.

27. The apparatus of claim 23, wherein the feedback piggybacking condition is based at least in part on a presence or absence of a downlink assignment index field in a downlink control information format associated with the downlink grant and a number of feedback bits associated with the uplink shared channel transmission.

28. The apparatus of claim 23, wherein the downlink grant comprises one or more of: scheduling information for a downlink shared channel transmission to the UE, an indication of a semi-persistent scheduling downlink shared channel transmission release, an indication of a secondary cell dormancy without scheduling a physical downlink shared channel reception.

* * * * *